(12) United States Patent
Agrawal et al.

(10) Patent No.: US 11,467,803 B2
(45) Date of Patent: Oct. 11, 2022

(54) IDENTIFYING REGULATOR AND DRIVER SIGNALS IN DATA SYSTEMS

(71) Applicant: Oracle International Corporation, Redwood Shores, CA (US)

(72) Inventors: Vikas Agrawal, Telangana (IN); Manisha Gupta, San Ramon, CA (US); Ananth Venkata, San Ramon, CA (US); Malhar Chaudhari, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 209 days.

(21) Appl. No.: 17/018,794

(22) Filed: Sep. 11, 2020

(65) Prior Publication Data

US 2021/0081170 A1 Mar. 18, 2021

(30) Foreign Application Priority Data

Sep. 13, 2019 (IN) .............................. 201941036990

(51) Int. Cl.
*G06F 16/30* (2019.01)
*G06F 7/08* (2006.01)
(Continued)

(52) U.S. Cl.
CPC ................ *G06F 7/08* (2013.01); *G06F 16/22* (2019.01); *G06N 20/00* (2019.01)

(58) Field of Classification Search
CPC ....... G06F 16/244; G06F 16/248; G06F 16/22
(Continued)

(56) References Cited

U.S. PATENT DOCUMENTS 5,642,519 A    6/1997   Martin
5,717,828 A    2/1998   Rothenberg
(Continued)

FOREIGN PATENT DOCUMENTS

EP    3309689    4/2018
JP    2013109364    6/2013
(Continued)

OTHER PUBLICATIONS

Causal Relationship (Year: 2001).*
(Continued)

*Primary Examiner* — Sana A Al-Hashemi
(74) *Attorney, Agent, or Firm* — Kilpatrick Townsend & Stockton LLP

(57) ABSTRACT

A method of identifying causal relationships between time series may include accessing a hierarchy of nodes in a data structure, where each node in the plurality of nodes may include a time series of data. The method may also include identifying a subset of nodes in the plurality of nodes for which causal relationships may exist in the corresponding time series. The method may additionally include generating a model for each of the subset of nodes, where the model may receive the subset of nodes and generate coefficients indicating how strongly each of the subset of nodes causally affects other nodes in the subset of nodes. The method may further include generating a ranked output of nodes that causally affect a first node in the subset of nodes based on an output of the corresponding model.

20 Claims, 17 Drawing Sheets

(51) Int. Cl.
 G06N 20/00 (2019.01)
 G06F 16/22 (2019.01)

(58) Field of Classification Search
 USPC ........ 707/609, 687, 705, 769, 790, 813, 821
 See application file for complete search history.

(56) References Cited

U.S. PATENT DOCUMENTS

| | | | |
|---|---|---|---|
| 5,966,690 | A | 10/1999 | Fujita et al. |
| 6,995,768 | B2 | 2/2006 | Jou et al. |
| 7,801,769 | B1 | 9/2010 | Kelly et al. |
| 7,869,989 | B1 | 1/2011 | Harvey et al. |
| 8,620,716 | B2 | 12/2013 | Nicholls et al. |
| 9,208,231 | B1 | 12/2015 | Upstill et al. |
| 9,911,094 | B1 | 3/2018 | Chen et al. |
| 11,238,409 | B2 | 2/2022 | Gupta et al. |
| 11,243,966 | B1* | 2/2022 | Wong ..................... G06F 16/244 |
| 2006/0046232 | A1 | 3/2006 | Peter |
| 2008/0124686 | A1 | 5/2008 | Forman |
| 2009/0083019 | A1 | 3/2009 | Nasle |
| 2010/0049538 | A1 | 2/2010 | Frazer et al. |
| 2011/0131082 | A1 | 6/2011 | Manser et al. |
| 2011/0161139 | A1 | 6/2011 | Maheshwari et al. |
| 2011/0261049 | A1 | 10/2011 | Cardno et al. |
| 2012/0053995 | A1 | 3/2012 | D' Albis et al. |
| 2012/0102396 | A1 | 4/2012 | Arksey et al. |
| 2013/0018824 | A1 | 1/2013 | Ghani et al. |
| 2014/0157142 | A1 | 6/2014 | Heinrich et al. |
| 2014/0258189 | A1 | 9/2014 | Schmidt |
| 2014/0282261 | A1 | 9/2014 | Ranz et al. |
| 2014/0358602 | A1 | 12/2014 | Jones |
| 2015/0113056 | A1 | 4/2015 | Srinivasan et al. |
| 2015/0120608 | A1 | 4/2015 | Leftwich et al. |
| 2015/0229661 | A1 | 8/2015 | Balabine et al. |
| 2015/0234869 | A1 | 8/2015 | Chan et al. |
| 2016/0057207 | A1 | 2/2016 | Li et al. |
| 2016/0092530 | A1 | 3/2016 | Jakubiak et al. |
| 2016/0170610 | A1 | 6/2016 | Bertram et al. |
| 2016/0171540 | A1 | 6/2016 | Mangipudi et al. |
| 2016/0239768 | A1 | 8/2016 | Jones |
| 2016/0379083 | A1 | 12/2016 | Sala et al. |
| 2017/0116624 | A1 | 4/2017 | Moore et al. |
| 2017/0124581 | A1 | 5/2017 | Wilson et al. |
| 2017/0243140 | A1 | 8/2017 | Achin et al. |
| 2017/0344927 | A1 | 11/2017 | Coletta et al. |
| 2017/0372695 | A1 | 12/2017 | Takei et al. |
| 2018/0046926 | A1 | 2/2018 | Achin et al. |
| 2018/0046987 | A1 | 2/2018 | Goren et al. |
| 2018/0060744 | A1 | 3/2018 | Achin et al. |
| 2018/0114128 | A1 | 4/2018 | Libert et al. |
| 2018/0253655 | A1 | 9/2018 | Wang et al. |
| 2018/0268082 | A1 | 9/2018 | Latzina |
| 2018/0276861 | A1 | 9/2018 | Wright et al. |
| 2018/0349474 | A1 | 12/2018 | Smith et al. |
| 2018/0365229 | A1 | 12/2018 | Buhrmann et al. |
| 2019/0066056 | A1 | 2/2019 | Gomez et al. |
| 2019/0104041 | A1 | 4/2019 | Tabak et al. |
| 2019/0156216 | A1 | 5/2019 | Gupta et al. |
| 2019/0186928 | A1 | 6/2019 | Blandin et al. |
| 2019/0188289 | A1 | 6/2019 | Suzuki et al. |
| 2019/0188605 | A1 | 6/2019 | Zavesky et al. |
| 2019/0197605 | A1 | 6/2019 | Sadler et al. |
| 2019/0220153 | A1 | 7/2019 | Kidron et al. |
| 2019/0268233 | A1 | 8/2019 | Singh |
| 2019/0306184 | A1 | 10/2019 | Oliner et al. |
| 2019/0317739 | A1 | 10/2019 | Turek et al. |
| 2020/0065857 | A1 | 2/2020 | Lagi et al. |
| 2020/0074295 | A1 | 3/2020 | O'donncha et al. |
| 2020/0103888 | A1* | 4/2020 | Sayyarrodsari .. G05B 19/41845 |
| 2020/0103895 | A1* | 4/2020 | SayyarRodsari .. G05B 23/0283 |
| 2020/0104775 | A1 | 4/2020 | Chintalapati et al. |
| 2021/0081170 | A1* | 3/2021 | Agrawal ..................... G06F 7/08 |
| 2021/0365611 | A1* | 11/2021 | Agrawal ............... G06F 16/284 |

FOREIGN PATENT DOCUMENTS

| | | |
|---|---|---|
| KR | 102148372 | 8/2020 |
| WO | 2021021328 | 2/2021 |

OTHER PUBLICATIONS

"Episodic Memory", Wikipedia, Available Online at: https://en.wikipedia.org/wiki/Episodic_memory, last modified Mar. 24, 2018, 9 pages.

"Win-Loss Analytics", Wikipedia, , Available Online at https://web.archive.org/web/20161228213605/https://en.wikipedia.org/wiki/Win%E2%80%93loss_analytics, Last modified Jan. 22, 2016, 1 page.

Runge et al., "Detecting and Quantifying Causal Associations in Large Nonlinear Time Series Datasets", Science Advances, vol. 5, Nov. 27, 2019, 15 pages.

U.S. Appl. No. 16/580,746, Non-Final Office Action dated Apr. 29, 2021, 40 pages.

U.S. Appl. No. 16/586,347, Notice of Allowance dated Feb. 7, 2022, 14 pages.

Lundberg et al., A Unified Approach to Interpreting Model Predictions, 31st Conference on Neural Information Processing Systems, Nov. 25, 2017, 10 pages.

U.S. Appl. No. 16/586,347, First Action Interview Pilot Program Pre-Interview Communication dated Feb. 9, 2021, 7 pages.

U.S. Appl. No. 16/145,963 Final Office Action dated Jan. 15, 2021, 24 pages.

U.S. Appl. No. 16/147,234 Final Office Action dated Dec. 11, 2020, 17 pages.

U.S. Appl. No. 16/140,153, Final Office Action dated Dec. 7, 2020, 27 pages.

U.S. Appl. No. 16/140,153, Non-Final Office Action dated Sep. 9, 2021, 12 pages.

U.S. Appl. No. 16/147,234, Notice of Allowance dated Sep. 30, 2021, 13 pages.

U.S. Appl. No. 16/580,746, Final Office Action dated Aug. 11, 2021, 89 pages.

U.S. Appl. No. 16/586,347, Final Office Action dated Sep. 17, 2021, 22 pages.

Foote, Keith D., *A Brief History of Machine Learning*, Dataversity, Available Online at: https://www.dataveisity.net/a-brief-history-of-machine-learning, Mar. 26, 2019, 8 pages.

Ramamurthy et al., *Identifying Employees for Re-Skilling Using an Analytics-Based Approach*, 2015 IEEE International Conference on Data Mining Workshop (ICDMW), Nov. 14-17, 2015, pp. 345-354.

Singh et al., *Propensity Modeling for Employee Re-Skilling*, 2017 Global Conference on Signal and Information Processing (GlobalSIP), Nov. 14-16, 2017, pp. 893-897.

TCH; Andrew, *The Mostly Complete Chart of Neural Networks, explained*, Towards Data Science, Available Online at: https://towardsdatascience.com/the-mostly-complete-chart-of-neural-networks-explained-3fb6f2367464, Aug. 4, 2017, 28 pages.

U.S. Appl. No. 16/145,963, Non-Final Office Action dated Oct. 29, 2021, 34 pages.

U.S. Appl. No. 16/140,153, Final Office Action dated Dec. 20, 2021,2021, 13 pages.

Runge et al., Detecting Causal Associations in Large Nonlinear Time Series Datasets, Cornell University Library, vol. 5, No. 11, Available Online at: https://arxiv.org/abs/1702.07007, Feb. 22, 2017, 46 pages.

Tiunov, Time Series Anomaly Detection Algorithms, Stats and Boats, Available Online at https://blog.statsbot.co/time-series-anomaly-detection-algorithms-1cef5519aef2, Jun. 8, 2017, 8 pages.

International Application No. PCT/US2019/053576, International Search Report and Written Opinion dated Dec. 12, 2019, 12 pages.

U.S. Appl. No. 16/140,153, First Action Interview Office Action Summary dated Jul. 1, 2020, 27 pages.

U.S. Appl. No. 16/140,153, First Action Interview Pilot Program Pre-Interview Communication dated May 4, 2020, 26 pages.

U.S. Appl. No. 16/145,963, First Action Interview Pilot Program Pre-Interview Communication dated Aug. 5, 2020, 5 pages.

(56) References Cited

OTHER PUBLICATIONS

U.S. Appl. No. 16/147,234, First Action Interview Pilot Program Pre-Interview Communication dated Aug. 5, 2020, 6 pages.

* cited by examiner

IDENTIFYING REGULATOR AND DRIVER SIGNALS IN DATA SYSTEMS

CROSS-REFERENCE TO RELATED APPLICATION

The present application is a non-provisional application of, and claims the benefit and priority of India Application No: 201941036990, filed Sep. 13, 2019, entitled "TECHNIQUES FOR DISCOVERING MASTER REGULATORS, HARBINGER SIGNALS, AND FOLLOWER SIGNALS IN ENTERPRISE DATA SYSTEMS," the entire contents of which are incorporated herein by reference for all purposes.

BACKGROUND

A metric can provide valuable information about real-world operations in an entity. Identifying which metrics are most valuable to the user for their decision making can be challenging. Relevant information for the user may be changing rapidly or stagnant. However, the user who regularly looks only at specific metrics may not be aware of the changes that are significant or contain valuable information, particularly if the user is regularly looking only at stagnant metrics.

BRIEF SUMMARY

In some embodiments, a method of identifying causal relationships between time series may include accessing a hierarchy of nodes in a data structure. Each node in the hierarchy of nodes may include a time series of data. The method may also include identifying a subset of nodes in the plurality of nodes for which causal relationships may exist in the corresponding time series. The method may additionally include generating models for nodes in the subset of nodes. Each of the models may be generated for a corresponding node. Each of the models may receive the other nodes in the subset of nodes as inputs, and may generate coefficients for the other nodes in the subset of nodes indicating how strongly each of the other nodes in the subset of nodes causally affects the corresponding node. The method may further include generating a ranked output of nodes that causally affect the corresponding node of each of the models.

In some embodiments, a non-transitory computer-readable medium may include instructions that, when executed by one or more processors, cause the one or more processors to perform operations including accessing a hierarchy of nodes in a data structure. Each node in the hierarchy of nodes may include a time series of data. The operations may also include identifying a subset of nodes in the plurality of nodes for which causal relationships may exist in the corresponding time series. The operations may additionally include generating models for nodes in the subset of nodes. Each of the models may be generated for a corresponding node. Each of the models may receive the other nodes in the subset of nodes as inputs, and may generate coefficients for the other nodes in the subset of nodes indicating how strongly each of the other nodes in the subset of nodes causally affects the corresponding node. The operations may further include generating a ranked output of nodes that causally affect the corresponding node of each of the models.

In some embodiments, a system may include one or more processors and one or more memory devices comprising instructions that, when executed by the one or more processors, cause the one or more processors to perform operations including accessing a hierarchy of nodes in a data structure. Each node in the hierarchy of nodes may include a time series of data. The operations may also include identifying a subset of nodes in the plurality of nodes for which causal relationships may exist in the corresponding time series. The operations may additionally include generating models for nodes in the subset of nodes. Each of the models may be generated for a corresponding node. Each of the models may receive the other nodes in the subset of nodes as inputs, and may generate coefficients for the other nodes in the subset of nodes indicating how strongly each of the other nodes in the subset of nodes causally affects the corresponding node. The operations may further include generating a ranked output of nodes that causally affect the corresponding node of each of the models.

In any embodiments, any or all of the following features may be included in any combination and without limitation. Other features described throughout this disclosure may also be added in any combination and without limitation. The method/operations may also include identifying master regulator nodes in the subset of nodes that causally affect a plurality of other nodes in the subset of nodes by greater than a threshold amount. The method/operations may additionally include receiving hypothetical time series data for a master regulator node; providing the hypothetical time series data as an input to the models corresponding to nodes that are causally affected by the master regulator node; generating graphical outputs of each of the models corresponding to the nodes that are causally affected by the master regulator node to show the effect of the hypothetical time series data from the master regulator node. The method/operations may further include determining an optimal hypothetical time series for the master regulator node; and providing the optimal hypothetical time series as a fixed input value to a path predictor algorithm to solve for an optimal solution relative to the nodes that are causally affected by the master regulator node. The hierarchy of nodes in the data structure may include a plurality of non-cyclical, linear parent-child relationships. Identifying the subset of nodes in the plurality of nodes for which causal relationships may exist may include identifying a user; accessing a pattern of previous node selections by the user; and identifying the subset of nodes based on the pattern of previous node selections by the user. Identifying the subset of nodes in the plurality of nodes for which causal relationships may exist may include identifying a user or user group; providing an identification of the user or user group to a trained model; and receiving a selection of the subset of notes from the trained model. The method/operations may also include identifying a plurality of data tables in a data warehouse associated with a node in the subset of nodes; and denormalizing the plurality of data tables into a single data table for the node before generating the corresponding model for the node. Identifying the subset of nodes in the plurality of nodes for which causal relationships may exist may include identifying a predicted CPU and memory usage; comparing the current CPU and memory usage to a threshold; and adding additional nodes from the hierarchy of nodes to the subset of nodes until the predicted CPU and memory usage reaches the threshold. The additional nodes may be identified as having overlapping time periods in data with at least one of the subset of nodes. The method/operations may additionally include eliminating nodes from the subset of nodes that do not show a statistically significant change of more than a threshold number of standard deviations in a corresponding time series of data. The method/operations may further include eliminating nodes from the subset of nodes for which at least a threshold number of incremental changes between entries in a corresponding time series of data are not in a same direction indicating a trend. At least one of the models may receive an exogenous variable from an external data source. The models may be configured to integrate to a maximum of three levels for each input node. A p-value for one of the models may be adjusted based on a number of data points in a time series of the corresponding node such that the p-value decreases an order of magnitude for each order of magnitude decrease in the length of the time series. The method/operations may also include eliminating nodes from the ranked output of nodes that have less than a threshold level of contribution to the corresponding node of a model. The method/operations may additionally include eliminating nodes as inputs to a model that have less than a threshold level of contribution to the corresponding node of the model. The method/operations may further include traversing the hierarchy of nodes in a breadth-first search to identify nodes that causally affect a plurality of other nodes.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Almost all entities store data using relational databases or multidimensional data warehouses. This data may include operational data that describes metrics and progression towards those metrics in terms of discrete data point measurements or inputs. The data may often be stored as a time series of data points, with each data point representing a snapshot in time of a metric that is captured at regular intervals. For example, a metric may be measured or recorded on a weekly basis and stored as part of a time series of values for that metric. These time series may later be used to analyze progression (or a lack thereof) towards a target value, along with diagnosing causes for any deviation from an expected trajectory within the time series, or to find point deviations or trend deviations from normal trends within pre-specified time periods.

Figure 1:
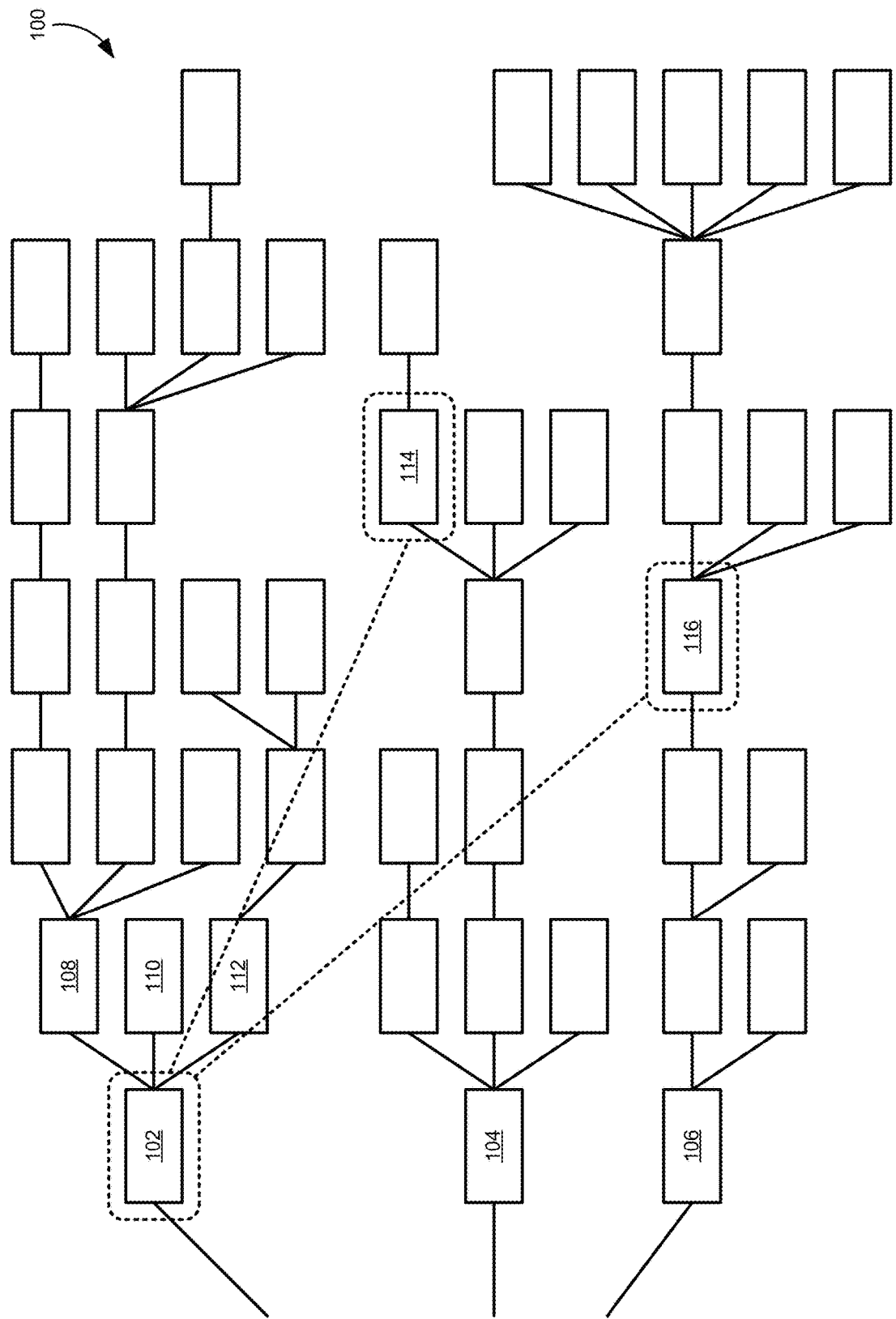
FIG. 1 illustrates a data structure that may be used to store a plurality of nodes representing individual time series, according to some embodiments.

FIG. 1 illustrates a data structure 100 that may be used to store a plurality of nodes representing individual time series, according to some embodiments. Each node in the data structure 100 may represent an individual time series for a metric. For example, node 102 may represent a plurality of values with corresponding timestamps that have been measured and recorded over time. Values may be continuously added to the time series of node 102 as they are received over time. In some embodiments, the time series of node 102 may continually grow as the measurements are received. Other embodiments may use a sliding window that keeps only the N most recent values added to this time series to replace the oldest entries in the time series. Note that the time series of node 102 and other nodes in the data structure 100 may represent any type of data, such as sensor measurements, characteristics of an entity, enterprise data, and so forth.

A data structure 100 may include elements arranged in a sequential manner, with each member element connected to its previous and/or next element. This type of data structure 100 may be traversed quickly by moving through each of the levels. Additionally, the data structure 100 may be hierarchical in nature. For example, the data structure 100 may be organized into different levels with parent relationships and child relationships. A parent-child relationship may indicate a causal relationship between the time series in the parent node and the time series in the child node, where the child node's times series is connected to changes in the parent node's time series. For example, node 102 may be linked to child nodes 108, 110, 112. In some cases, the child nodes 108, 110, 112 may contribute to the value stored in the parent node 102. For example, values in the time series of the child nodes 108, 110, 112 may predict or contribute to the time series in the parent node 102. However, a parent-child relationship need not always indicate a causal relationship between time series. In some cases, the time series stored in the parent node 102 may be related to the time series in the child nodes 108, 110, 112 in a non-causal way. For example, the time series in node 102 may be provided by an entity that is a parent organization to an organization providing the time series in node 108.

Beginning with the data structure 100, some embodiments may train models to predict the future values of an ongoing time series by using current or past values of other time series as inputs to the model. For example, future values of the time series in node 102 may be predicted by training a model using the time series in child nodes 108, 110, 112 as inputs. Some embodiments may also use the outputs of the model to determine whether an anomaly has taken place in the time series of node 102 by comparing the predicted values generated by the model with actual values recorded to the time series of node 102 as time moves forward. In this example, it is assumed that the child nodes 108, 110, 112 are related to the parent node 102 in a causal way, such that their time series can be used to predict the time series in node 102. Because of the parent-child relationships, the tree data structure 100 provides a good starting point for determining which nodes contribute to other nodes.

However, a technical challenge exists in relying only this type of data structure 100 to detect causal relationships. Specifically, the most significant causal relationships between nodes may not be accurately captured in the parent-child relationships of the data structure 100. For example, the time series of node 102 may be better predicted by the time series of node 114 and node 116. However, node 114 and node 116 are not connected via a parent-child relationship to node 102. This information is hidden in the data structure 100. In this example, a linear path between these two nodes may not even exist. The lack of an obvious connection makes it difficult to identify these important causal relationships that may be most beneficial when using a model to predict future values in a time series.

Another technical challenge exists in how to identify these causal relationships that are not immediately apparent in the tree data structure 100. Specifically, although the tree data structure 100 illustrated in FIG. 1 comprises only a small number of nodes, real-world examples of tree data structures 100 representing data collected for an organization may include thousands of individual nodes and relationships. Performing a many-to-many analysis to identify correlations between each node in the tree data structure 100 simply requires too much computing power for standard systems. Although such computations may be performed, they may not be performed regularly at frequent intervals. This means that data may become stale or no longer actionable. Furthermore, the relationships between nodes may change dramatically over time such that up-to-date data and frequent updates to models may be a necessity for providing useful, actionable information. Therefore, improvements are needed in the way that causal relationships are discovered in a plurality of nodes.

As used herein, the term "nodes" may represent a data structure that stores or links to a time series of information. The time series may include a plurality of data points and a plurality of corresponding times. In some cases, the time series may include a series of values without corresponding timestamps with the understanding that the values are recorded at regular intervals. Therefore, this disclosure may make reference to a node, and this reference may also refer to the time series and values/timestamps stored or referenced by the node. For example, stating that a node has a causal relationship with another node may be interpreted to mean that the time series within the first node may be used as an input to a predictive model trained to output the second time series.

Figure 2:
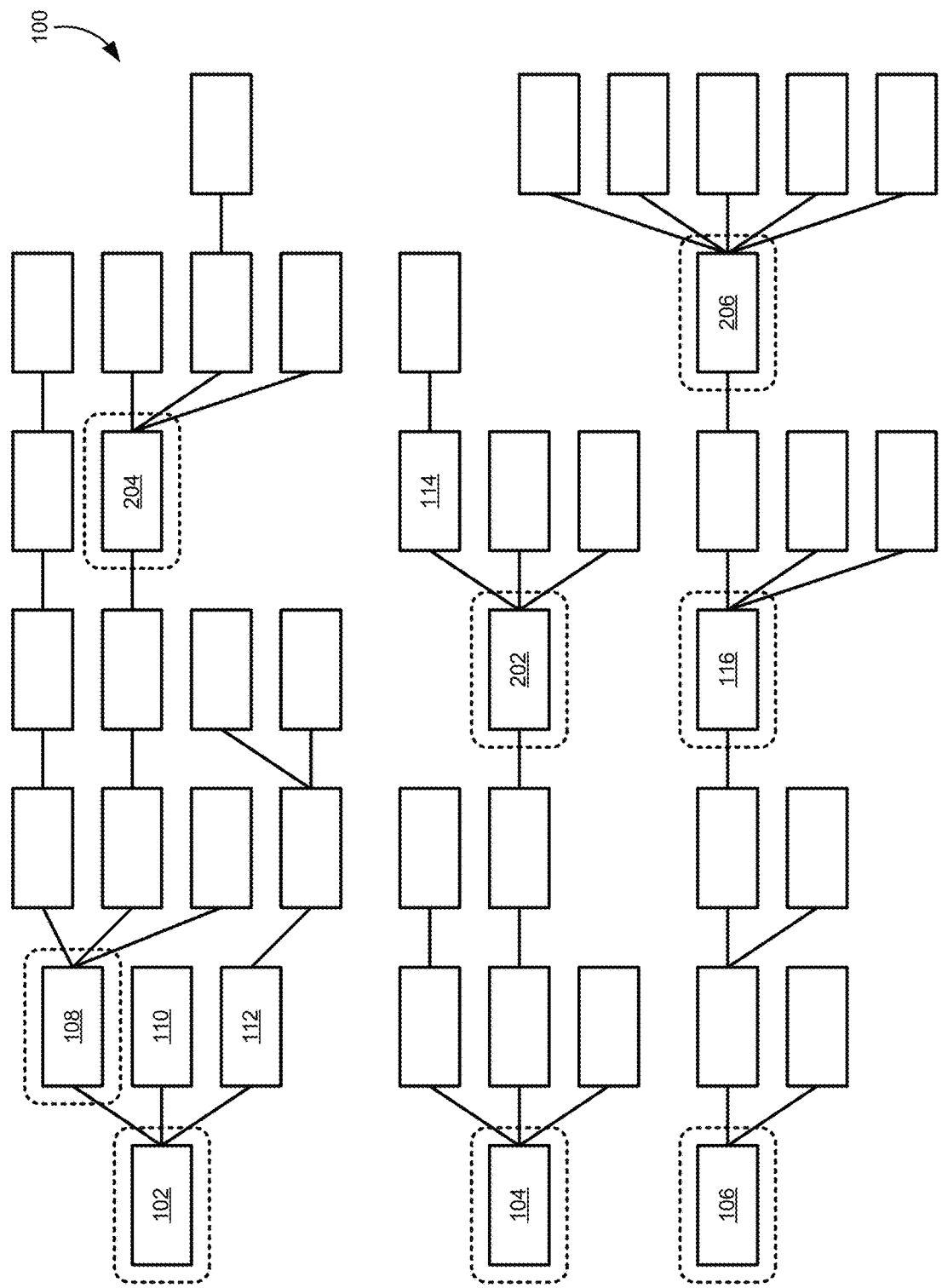
FIG. 2 illustrates how different methods can initially be used to reduce the search space for identifying hidden relationships in a network of nodes, according to some embodiments.

FIG. 2 illustrates how different methods can initially be used to reduce the search space for identifying hidden relationships in a network of nodes, according to some embodiments. A first step in identifying hidden causal relationships between nodes may include narrowing the search space for the search algorithms. As mentioned above, the data structure 100 may include thousands or even millions of nodes, and reducing the number of nodes considered by these algorithms can significantly increase the speed at which these algorithms can be completed and may make the complex model generation described below feasible on standard computing systems.

A first method for reducing the number of nodes considered by the algorithms described below may be to use domain expert information to initially select a number of nodes that should be considered. Experts in the type of organization represented by the time series of the nodes may be able to quickly identify an initial set of nodes that should be considered. In this example, a domain level expert may initially select nodes 102, 104, 106, 108, and 204 as nodes that are of interest to a particular analysis and which may be involved in one or more causal relationships between these nodes. Note that this step need not require human interaction or human input in order to select these nodes. Instead, some embodiments may use stored values that pre-identify nodes that should be considered in such an analysis. For example, each new analysis may draw from a library of pre-identified nodes that should be used specific to that type of analysis in the industry.

A second method for reducing a number of nodes in the search space may include receiving selections from a user that is performing the immediate analysis. Each individual analysis may be unique, and a user performing the analysis may be able to quickly identify additional nodes that are not part of the domain-expert set of nodes described above. In this example, an individual user may identify node 206 as an additional node that may be related to the existing set of nodes.

In addition to using explicit user selections, some nodes may be selected automatically based on previous usage patterns by users having similar roles. Some embodiments may retrieve a user role for a current user and use that information to identify a set of nodes that have been previously identified by other users having the same user role. For example, an administrative user may be provided with an initial selection of nodes in the data structure 100 based on usage patterns of nodes that were selected by previous administrative users. Some embodiments may train a model using machine learning techniques to identify node selections that take place with each type of user. This model may be trained over time to evolve with user preferences. Each different user role or user type may be associated with a corresponding trained model for generating an initial selection of nodes. This allows nodes to be selected that are identified over time as being useful for particular classes of users. This recommendation may include additional nodes, such as node 202 and node 116.

The combination of methods described above in relation to FIG. 2 may generate an initial selection of nodes as illustrated in FIG. 2. In this simplified example, the number of nodes to be searched has already been greatly reduced from the total number of nodes in the tree data structure 100. Some embodiments may also automatically respect the hierarchy and relationships inherent in the tree data structure 100 and/or data tables representing the individual time series. For example, a selection that includes node 102 may also automatically include nodes 108, 110, and/or 112 as suggested by the hierarchy of the tree data structure 100.

Figure 3:
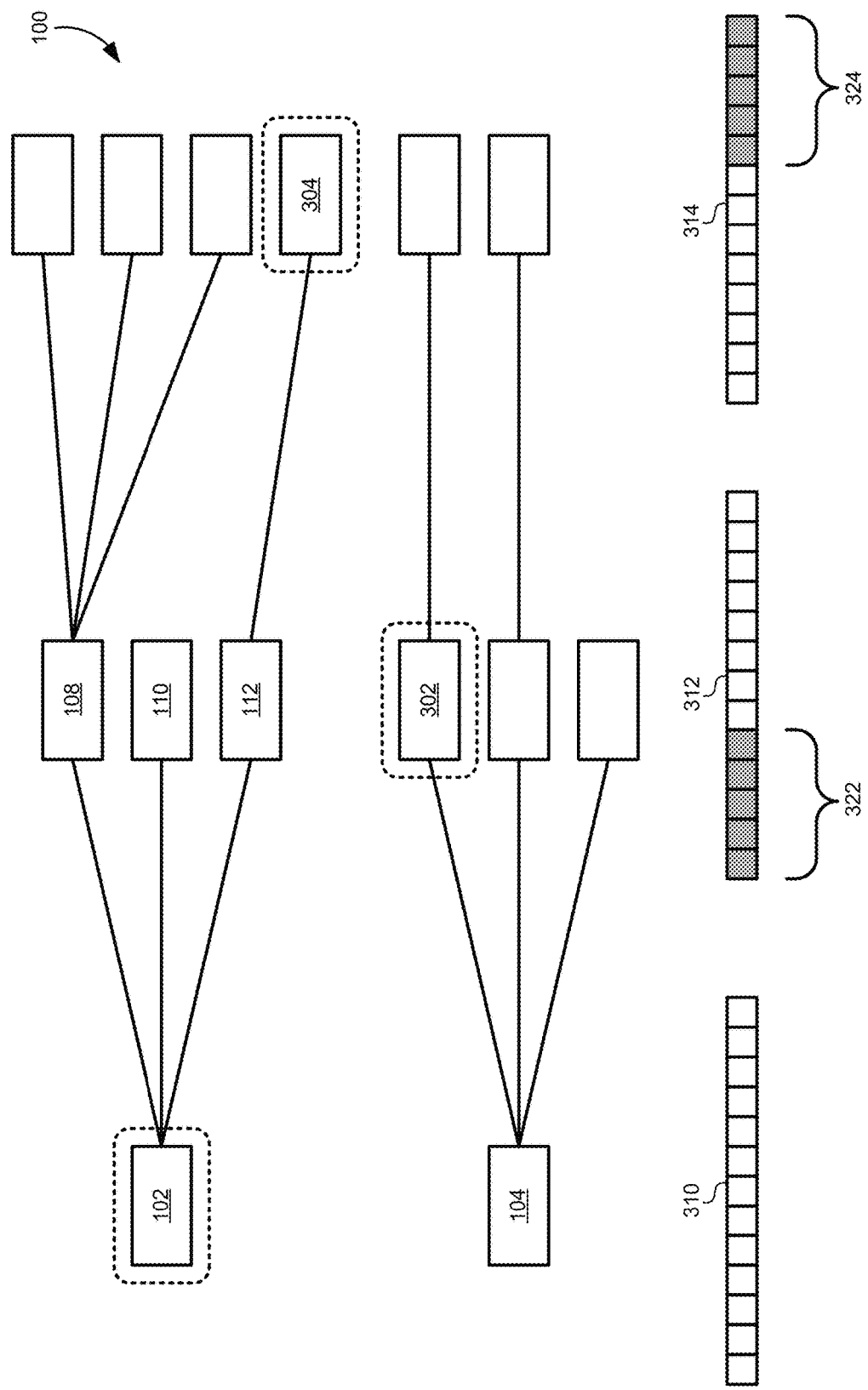
FIG. 3 illustrates how additional time series may be added to the pool of time series for analysis by identifying time relationships between time series, according to some embodiments.

FIG. 3 illustrates how additional time series may be added to the pool of time series for analysis by identifying time relationships between time series, according to some embodiments. Note that only a subset of the tree data structure 100 is provided in FIG. 3 for the sake of clarity. Although the purpose of the steps described above is to limit the size of the node pool under consideration, some embodiments may intelligently add additional nodes into the node pool as allowed by available computing resources.

For example, some embodiments may compare available CPU and memory resources with a current CPU/memory requirement based on the current size of the node pool. If an amount of CPU/memory resources available are at least two orders of magnitude greater than the requirements for the analysis of the current node pool, additional nodes may be added to the analysis. For example, if a computing system includes 500 16-core CPU equivalents and 100 TB of memory, and the current analysis requires 20 4-core CPU equivalents and 1 TB of memory, 10 times the number of existing nodes may be added as additional nodes to the node pool, compared to the existing node pool. A current computing resource requirement may be estimated and compared to an available computing resource measurement. If there are more than a threshold amount of available resources, then additional nodes may be added to the node pool.

As described above, an additional technical challenge involves maintaining a result set that is not stale or outdated as relationships between nodes change over time. Therefore, some embodiments may adjust the total number of nodes in the node pool based on a refresh rate of the analysis. For example, if the time expected for changes in relationships is least two orders of magnitude larger than the data refresh cycle of the analysis, 10 times the number of existing nodes may be added as additional nodes, compared to the existing number of nodes. If the data refresh cycle is daily, a broader search may be conducted with a larger node pool only once a quarter, or once every six months. This ensures that the data is refreshed before it becomes stale, with the compute time required to perform the analysis described below, at least in part, determining the refresh rate. Some embodiments allow trade-offs between refresh times and CPU memory scaling requirements. For example, using an order of magnitude more power/CPU/memory may deliver a refresh time only one order of magnitude longer than the data refresh time. Therefore, these two metrics may be balanced together to add additional nodes to the node pool.

In order to determine which nodes to add to the node pool if the compute/time requirements allow, some embodiments may identify nodes with overlapping time intervals in the data available that are significant for the particular problem under analysis. For example, node 102 may include a time series 310 that that is recorded over a time interval as described above. Similarly, node 302 may include a time series 312, and node 304 may include a time series 314. Node 102, node 302, and node 304 need not be related to each other in a linear, obvious relationship.

Despite the lack of a linear relationship, the possibility exists that these nodes 102, 302, 304 may still be causally related. After determining that the requisite compute/time resources exist, the algorithm may begin adding nodes that have overlapping time periods in the data which are significant for a particular problem identified by the user. Certain problem types may require recent overlapping data. A portion 322 of the time series 312 for node 302 may overlap with the time series 310 for node 102. Alternatively, some types of problems may have a delay between a node that affects another. For example, time series 314 may include a portion 324 of the time series 314 that occurred in the past, yet which may be relevant to a current time series 310 for node 102. The delay that may be used for identifying these time series may be defined by the problem and data under analysis. Different problem types and data sets may entail explicit identification of specified delays between time series, through user specification or a temporal causal relationship search using the principle that if previous values of X and Y together predict Y better than previous values of Y alone, then X is a causal factor for Y, and once such identification is done, those time-shifted time series may be included in the node pool, as the compute/time requirements allow.

The algorithm may continue adding time series as long as the system performance thresholds based on compute/time requirements are not breached. The algorithm may begin by including nodes where the overlap is greatest (i.e., greater than a threshold such as 90%) and may continue adding nodes using lower thresholds up to but not below 50%, if the compute/time requirements allow.

Figure 4:
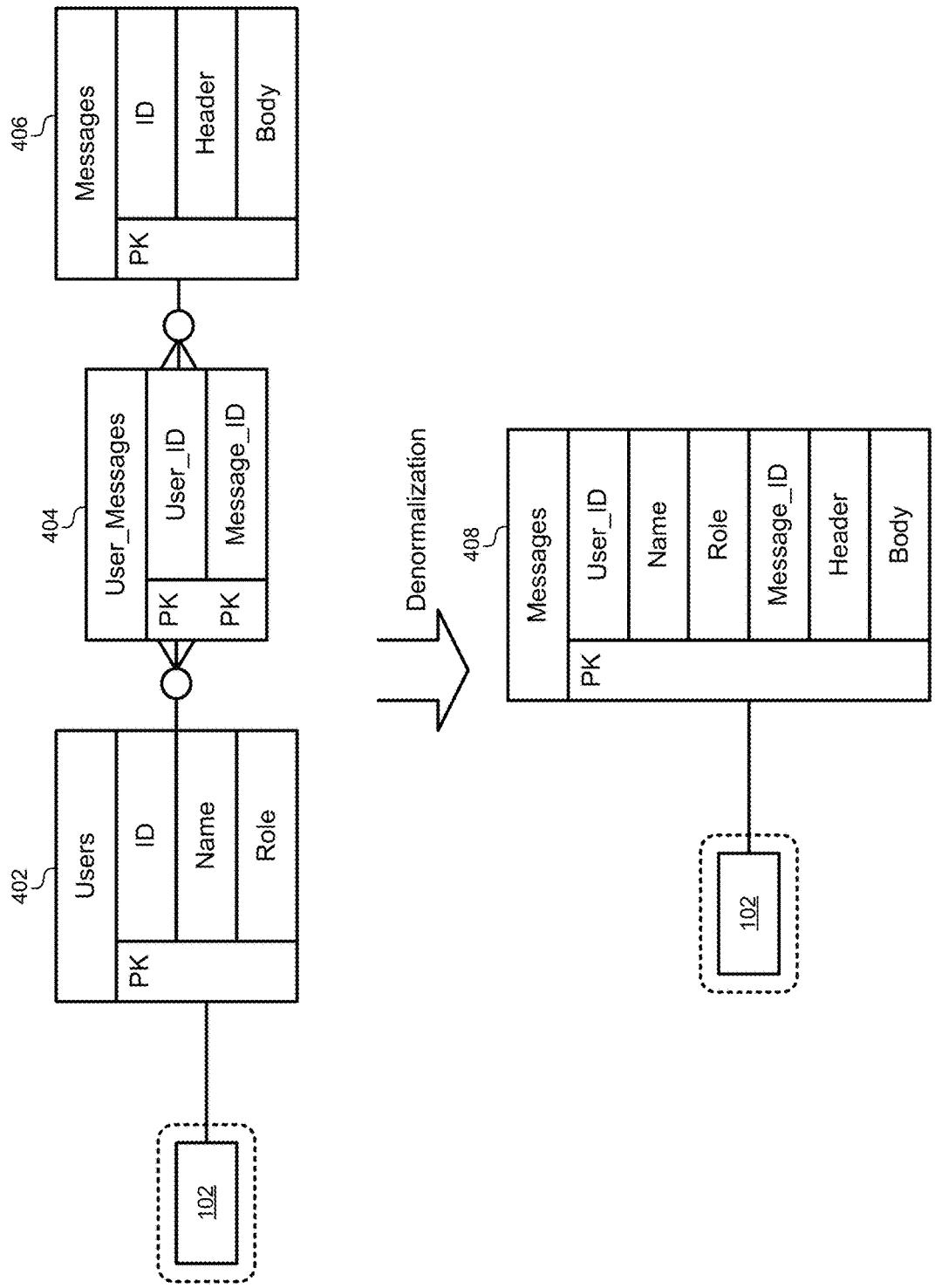
FIG. 4 illustrates how data tables representing the time series may be denormalized to improve performance, according to some embodiments.

FIG. 4 illustrates how data tables representing the time series may be denormalized to improve performance, according to some embodiments. Each time series may be associated with one or more data tables and may typically be associated with a plurality of data tables. Each data table may be associated with the node or sub node that contributes to variations in the current node. When these data tables are stored in a data warehouse, data in multiple tables may be denormalized and collected into a single table per node, with time stamps for each data point.

In the example of FIG. 4, node 102 may include a table 402 referencing a set of users. That table 402 may reference another table 404 storing information for a plurality of user messages. A third table 406 may store individual message texts. Using a denormalization algorithm, these tables may be combined into a single table 408 for node 102. By denormalizing each of the tables for the nodes included in the node pool under analysis, the algorithm described below for identifying causal relationships between nodes may be run significantly faster.

At this stage, a pool of relevant nodes has been identified for analysis. Again, it is not feasible to frame the analysis problem in terms of finding relationships between nodes in an all-to-all search, as that version of the problem is computationally intractable in its general form due to the exponential explosion in compute time and memory requirements. Rather, the algorithm now may begin with a set of denormalized seed tables identified using the methods described above. This allows the algorithm described below to identify causal relationships to be contained computationally and focused on the particular needs of the individual user. Note that this does not limit any super user with large CPU/memory resources available to perform a much broader/deeper search between additional nodes in the tree data structure 100 to find additional node relationships that may be missed in the smaller node pool. However, allowing a search that is too broad/deep runs the risk of finding spurious relationships that are highly correlated but not causal. Some embodiments may generate a warning or alert to users as the node pool size expands above a threshold amount. For example, if the number of nodes in the node pool expands to larger than a threshold number of nodes (e.g., 30 nodes) or more than a threshold percentage of nodes in the data structure 100 (e.g. 10% of the total number of nodes in the data structure 100), an alert may be generated indicating that the model complexity may lead to weaker discriminative power in the results.

As described above, each of the nodes represents a time series, and many of the causal dependencies discovered will be non-stationary over time. In other words, input distributions may tend to change over time and there may be changes in the relationships as processes change. Some embodiments may even change the data generating process over time such that values in the time series are distributed very differently than the values in the past. By shrinking the node pool as described above, these relationships may be identified much faster and more often to remain current.

Figure 5:
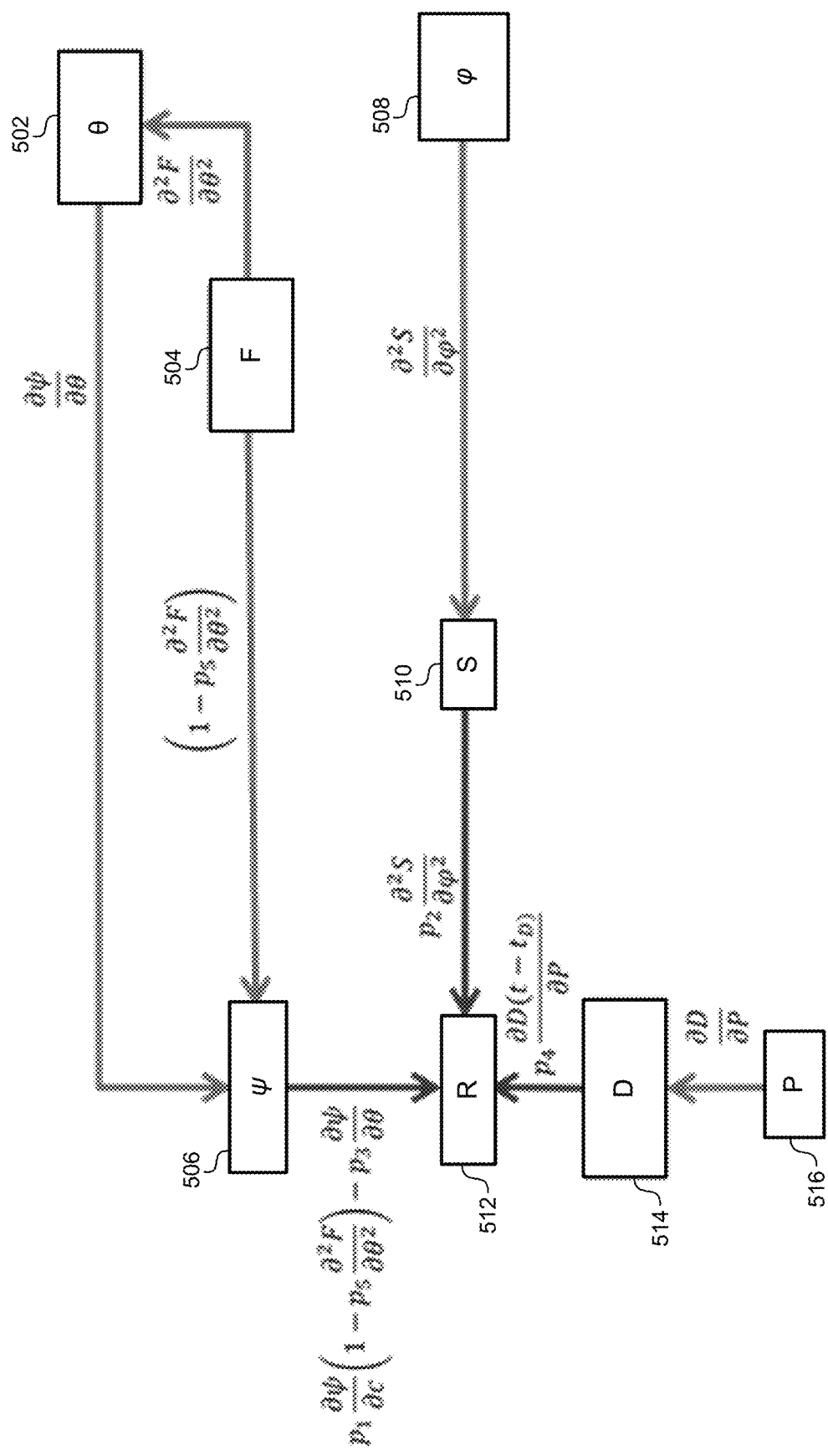
FIG. 5 illustrates how potential relationships between nodes may be represented as a set of partial differential equations, according to some embodiments.

FIG. 5 illustrates how potential relationships between nodes may be considered to be an approximation for representation as a set of partial differential equations, according to some embodiments. Only by way of example, some nodes may represent input values in an entity, and one of them may be considered an output for the purpose of modeling the relationships. Each of these input values may be stored as a time series in the nodes as described above. FIG. 5 illustrates partial derivative relationships between nodes that may exist within an entity to contribute causally to the node R. A partial delay differential equation representing a temporal causal model that embodies relationships in a very small part of the network for just one dependent variable may be expressed as:

$$\frac{\partial R}{\partial t} = p_1 \frac{\partial \psi}{\partial c}\left(1 - p_5 \frac{\partial^2 F}{\partial \theta^2}\right) + p_2 \frac{\partial^2 S}{\partial \varphi^2} - p_3 \frac{\partial \psi}{\partial \theta} + p_4 \frac{\partial D(t - t_D)}{\partial P}.$$

In this example, the symbols may represent the following time series variables: R=Revenue 512, P=Profit 516, S=Sales 510, F=Factory Downtime 504, D=Development Investment 514, c=Operational Costs, Ψ=Production 506, φ=Market Demand 508, and θ=Workforce Availability 502. In the equation above, the additional terms may be interpreted as follows.

$$\frac{\partial \psi}{\partial c}$$

may represent a rate or increase/decrease in production with a small change in operational cost.

$$\frac{\partial \psi}{\partial \theta}$$

may represent a rate of change in production with a small change in availability.

$$\frac{\partial D}{\partial P}$$

may represent a rate of change in development with a small change in profit.

$$\frac{\partial^2 F}{\partial \theta^2}$$

may represent a rate of rate of change in factory downtime with a small change in workforce availability.

$$1 - p_5 \frac{\partial^2 F}{\partial \theta^2}$$

May represent a normalized rate of rate of change of uptime with respect to availability.

$$\frac{\partial^2 S}{\partial \varphi^2}$$

May represent a rate of rate of change of sales with respect to a change in production. The parameters $p_1, p_2, p_3, p_4, p_5$ may represent parameters that are fit from the actual data for each of these variables. $t_D$ may represent a time delay between the investment in product development and the effects appearing in production. The equivalent of multiple such equations, one for each variable or metric, may be embodied by the models described below, and the parameters or coefficients may be generated by the models.

Note that this equation and node variables in FIG. 5 are provided only by way of example and are not meant to be limiting. Again, the nodes may represent any type of time series data collected by an entity. However, the actual data set determines different types of relationships. The algorithms described herein are concerned with identifying any type of relationship that may be described using the equivalent of these types of partial delay differential equations.

Figure 6:
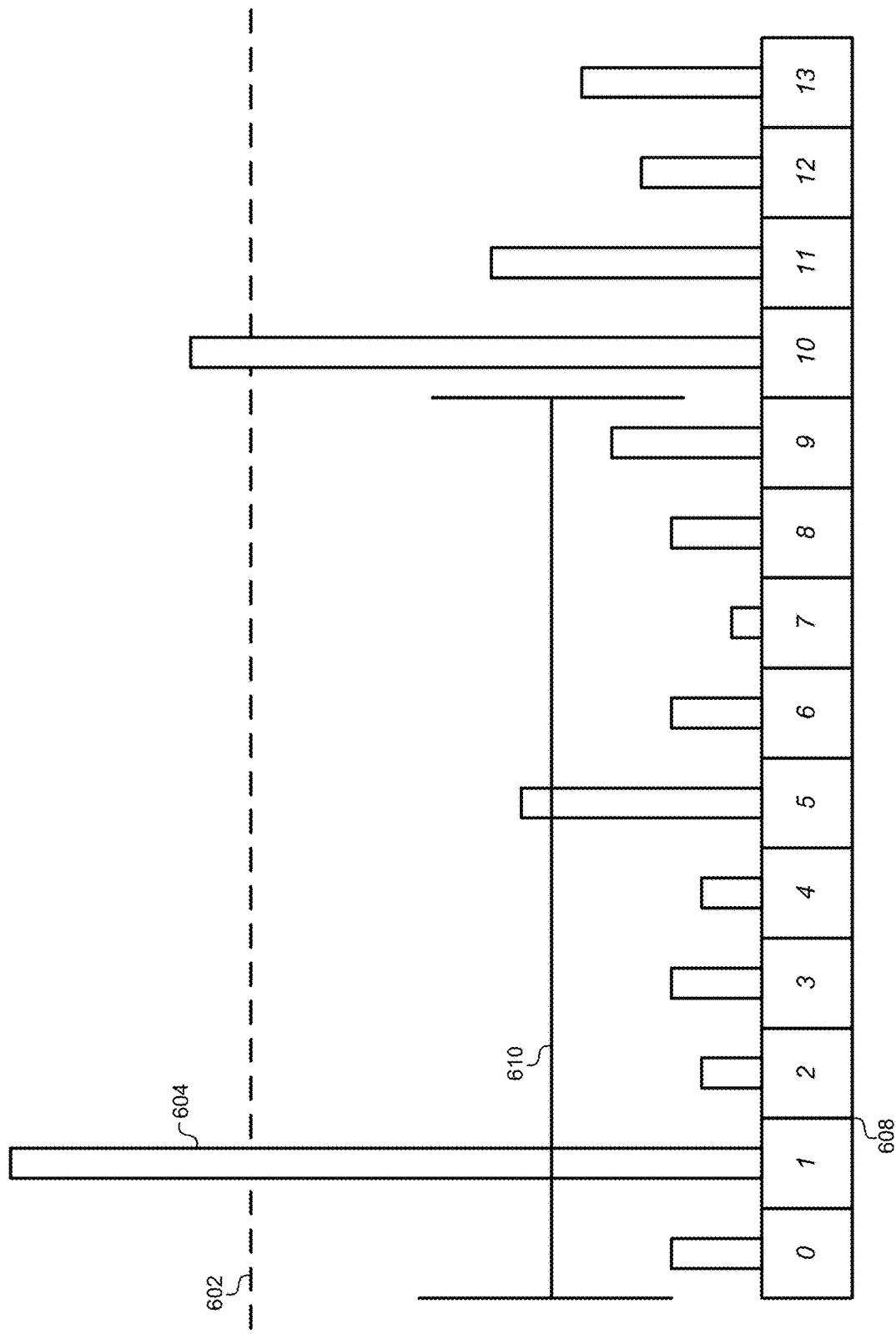
FIG. 6 illustrates one time series represented by a node that removes anomalies and normalizes the remaining values, according to some embodiments.

To begin processing the pool of nodes to identify relationships, some embodiments may first normalize each of the data sets. FIG. 6 illustrates one time series represented by a node that removes anomalies and normalizes the remaining values, according to some embodiments. A time series 608 may include a plurality of values having different magnitudes at each time. A threshold 602 may be established to remove outliers from the time series. These extreme point anomalies may be a limited by setting the threshold 602 a predetermined number of standard deviations away from the mean. For example, some embodiments may use a threshold 602 that is six sigma or nine sigma away (using domain specific requirements or based on factory requirements) from the mean of a surrounding subset of data points in the time series 608. These anomalies may represent real-world events that are themselves anomalies, such as a mass attrition event or a natural disaster that do not reflect a persistent influence of data generating process change within the data set.

Some embodiments may remove anomalies after accounting for them by setting the threshold 602 relative to a sliding window 610 of values within the time series 608. The sliding window may be a predetermined number of values within the time series 608. For example, some embodiments may use the 30 nearest neighbors in the window 610. Other embodiments may use the nearest 100 neighbors in the window 610. The position of the window 610 may begin at a most current data point in the time series 608 and extend backwards in time. The window 610 may be a sliding window that includes new values as they are received and removes old values as they become stale on a tail end of the window 610. In this example, a mean value or median value may be calculated using the data points in the window 610 to add a specified number of standard deviations to it to generate a threshold 602 that is six sigma above the calculated mean. Using this threshold 602, the algorithm may remove the value 604 from the time series 608. Some embodiments may remove the data point entirely, while other embodiments may replace it with the mean value or median value or most frequently occurring value instead.

In addition to removing anomalies, some embodiments may also normalize all of the input data in each of the time series using a self-normalized Z-score in terms of a number of standard deviations each data point is away from a median of the entire time series data set for each variable taken individually. This normalizes each of the time series with respect to themselves. Note that the anomaly values are removed as anomalies and the time series is self-normalized for purposes of applying this modeling algorithm only. The actual data in the time series 608 stored in the data warehouse typically do not need to be changed by this process. Only additional columns with this normalized data are included. After removing point anomalies and self-normalizing, each of the individual time series in the pool of nodes are ready to be processed.

At this stage, the algorithm may begin to identify nodes within the pool of nodes that may be of interest to the user for immediate visualization. Using the selection criteria described above, the pool of nodes may include a subset of the total number of nodes in the data structure 100 that may possibly be of interest. This step further narrows the list down to statistically determine whether a sufficient change has taken place within the time series within a recent time interval to be of interest to the user.

Figure 7:
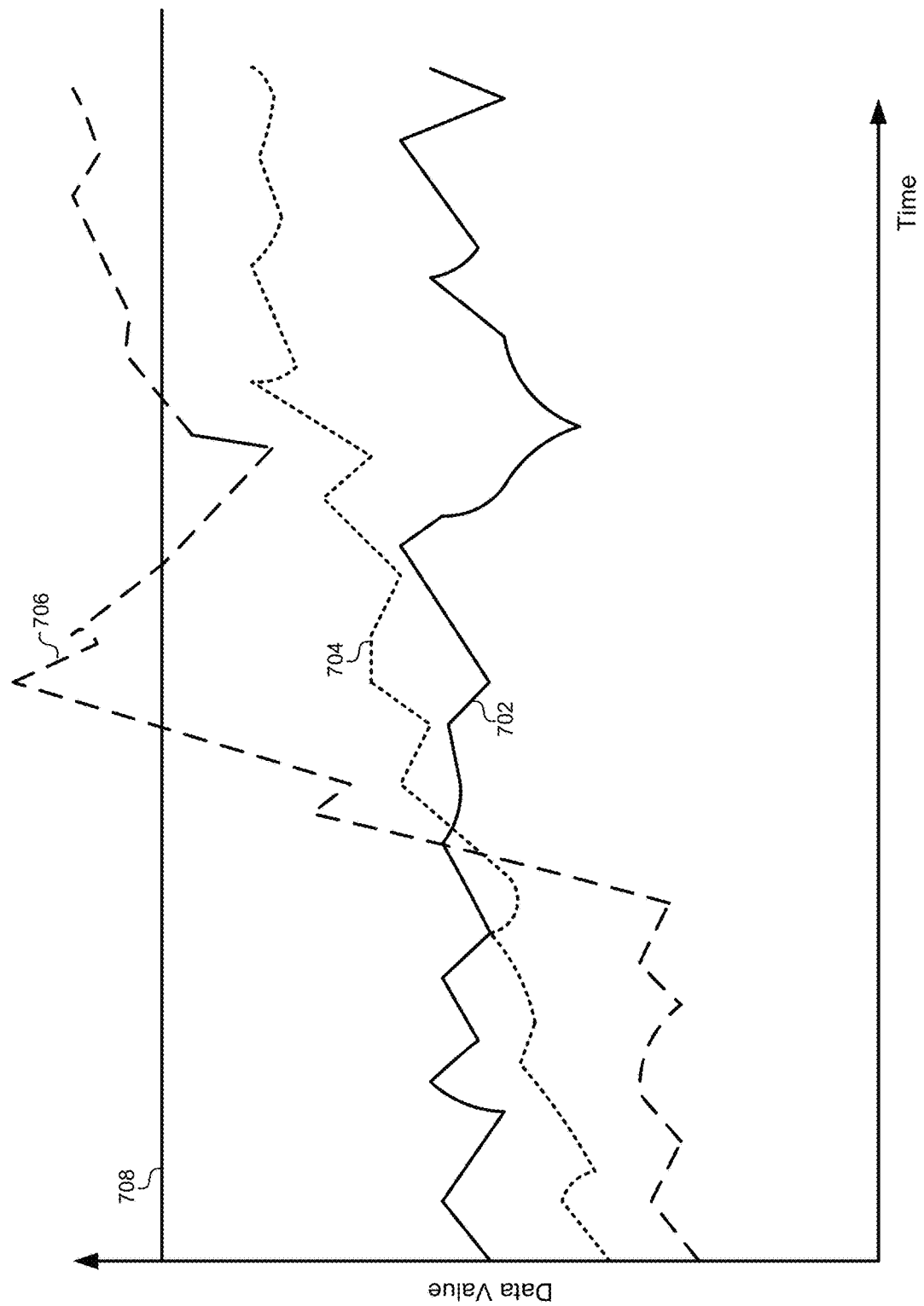
FIG. 7 illustrates a graph of values of three different time series, according to some embodiments.

FIG. 7 illustrates a graph 700 of values of three different time series, according to some embodiments. A first time series 702 may stay relatively stable during a time interval (e.g. during the last 90 days). A first test that may be carried out on this data is to determine whether the first time series 702 exhibits a statistically significant change across the time interval of interest to the user. For example, some embodiments may determine whether the cumulative changes exceed more than one standard deviation from the mean. As illustrated in FIG. 7, the cumulative changes of the first time series 702 do not exceed a standard deviation. Therefore, the node corresponding to the first time series 702 may be removed from the node pool. This indicates a node that, although of initial interest to a user, does not change significantly enough to continue to be of interest for presentation in a visualization.

A second time series 706 may also be analyzed using the same methodology. Specifically, it may be determined that the cumulative changes in the second time series 706 may exceed a threshold 708 determined by a number of standard deviations. Some embodiments may set the threshold 708 to be at a level of 1.0 standard deviation, 1.5 standard deviations, 2.0 standard deviations, and so forth. This may indicate that a statistically significant change has taken place within the data of that time series. This may indicate a change in the time series that may be of interest to the user for presentation in a visualization.

A third time series 704 may not exhibit a statistically significant change based on the threshold 708 alone. However, some embodiments may add a second criteria that instead analyzes individual changes between data points in the time series 704. For example, if more than a threshold number of the incremental changes occur in the same direction, the time series 704 may be considered to illustrate a gradual trend. This trend may indicate that something in the world has changed that drives the underlying data points consistently in a specific direction. In one embodiment, a threshold such as requiring that two thirds of the changes be in a same direction may be used.

After determining whether a deviation is statistically significant, some embodiments may also determine whether a deviation is practically significant. Practical significance may express how large the deviation is from normal distribution. For example, exceeding the threshold 708 may flag a data set for a further, more practical analysis. This further analysis may subject the time series 706 to an additional threshold. For example, if the time series 706 drifts more than two standard deviations, the extent of this deviation may be considered to be of practical significance. Some embodiments may also further calculate a cost due to the deviation. This cost may indicate a real-world impact on an organization, and this cost value may be compared to a cost threshold to further determine practical significance. Some embodiments may also determine practical significance by determining whether the deviation has occurred more than a threshold number of times in the past or more than for other variables. For example, if the deviation for the time series 706 occurs only once, this may indicate practical insignificance, whereas if the deviation for the time series 706 has occurred multiple times within a previous time interval, this may indicate practical significance. Alternatively, if a certain deviation has never occurred in the past, and it occurs multiple times, that may also indicate a change in the process worthy of examination by the end user.

At this stage, for the purpose of visualization, the node pool of data sets may be pared down to include data sets exhibiting a change that is both statistically significant and practically significant as described above. These time series are presented to the user with time series plots, showing thresholds and distributions. The data used for visualization here is the original unnormalized data without removing extreme anomalies.

Figure 8:
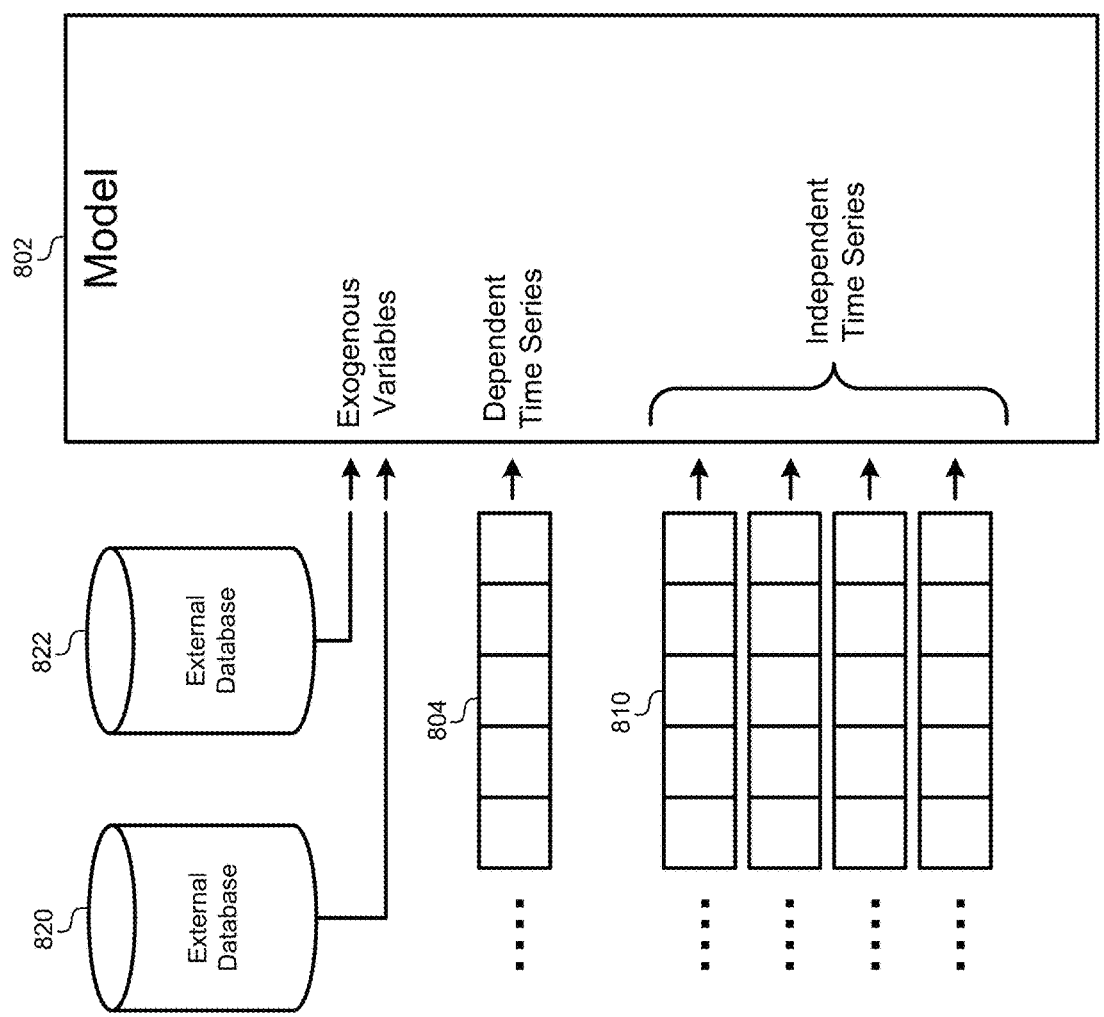
FIG. 8 illustrates a process for generating a model for each of the time series in the node pool, according to some embodiments.

The algorithm may now proceed to identifying relationships between the nodes in the selected and cleaned pool of nodes. FIG. 8 illustrates a process for generating a model 802 for each of the time series in the node pool, according to some embodiments. The model 802 may be generated for a single one of the time series 804 that will be considered a dependent variable. Each of the remaining time series 804 in the node pool may be considered independent variables by the model 802. This process described below may execute for each of the time series in the node pool to generate a trained model for each. The models may be trained by fitting parameters to a weighted combination of each of the independent variables received by the model 802.

First, the model 802 may function autoregressively. To function in this manner, the model 802 may predict future values of the time series 804 based at least in part on previous values of the time series 804. This type of model 802 tends to be well-suited for real-world time series data, as previous values for many data points rely on previous data points. At this step, the modeling process may also identify seasonality and trends in each of the variables.

To establish a causal relationship aside from the previous values of the same time series 804, some embodiments may use a model 802 that also identifies other time series 810 that improve this prediction. The model 802 may function under the basic principle that if the time series 804 is better predicted by previous values of the time series 804 and previous values of a second time series than a prediction of the time series 804 based on the previous values of the time series 804 alone, then there is a causal relationship between the second time series and the time series 804. This is known as the Granger causality test. Stated another way, if a prediction model 802 for the time series 804 is more accurate by including the second time series as an input, then the second time series may have a causal relationship with the time series 804.

The model 802 may also function by integrating time series 810 in order to identify integrated causalities. For example, acceleration data may not necessarily be correlated with distance data or velocity data when viewed as a single time series. However, when integrating acceleration data, the time series will now be heavily correlated with velocity data. A second integration may cause the acceleration time series to also be heavily correlated with distance data. Many real-world time series show strong correlations with other time series when one or more integrations take place in the model 802. A number of integrations performed may reveal dependencies that extend up the hierarchy in FIG. 1 multiple levels.

To better identify similarities between time series, some embodiments of the model 802 may also impose a moving average on the time series. A moving average may smooth each of the time series 804, 810 under consideration to remove small variations, may prevent noise from accumulating, and may instead allow the model to identify causal relationships due to movement trends that are exposed after this type of low-pass filter is applied to remove as much noise as possible.

Some embodiments may also incorporate exogenous variables that are outside of the data structure 100. The time series represented by these exogenous variables may be retrieved from outside data sources 820, 822. Analyzing of the effect of exogenous variables may attempt to provide an explanation for time series changes within an organization due to variables that are not tracked in the time series nodes of the data structure 100. Instead, these changes in time series may be explained by larger forces outside of the organization (e.g., macroeconomic indicators, an unemployment rate, census data, climate/weather data, CPI, GDP, etc.).

Combining these model features, the model 802 may be generated by calculating how a weighted sum of previous states of independent time series 810, some of which may be integrated one, two, or more orders of integration over time, determines a current state of the dependent time series 804. In this specific example, the model 802 may operate by calculating how a weighted sum of previous states of other time series 810 and any of the exogenous variables affect the time series 804 under consideration.

Figure 9:
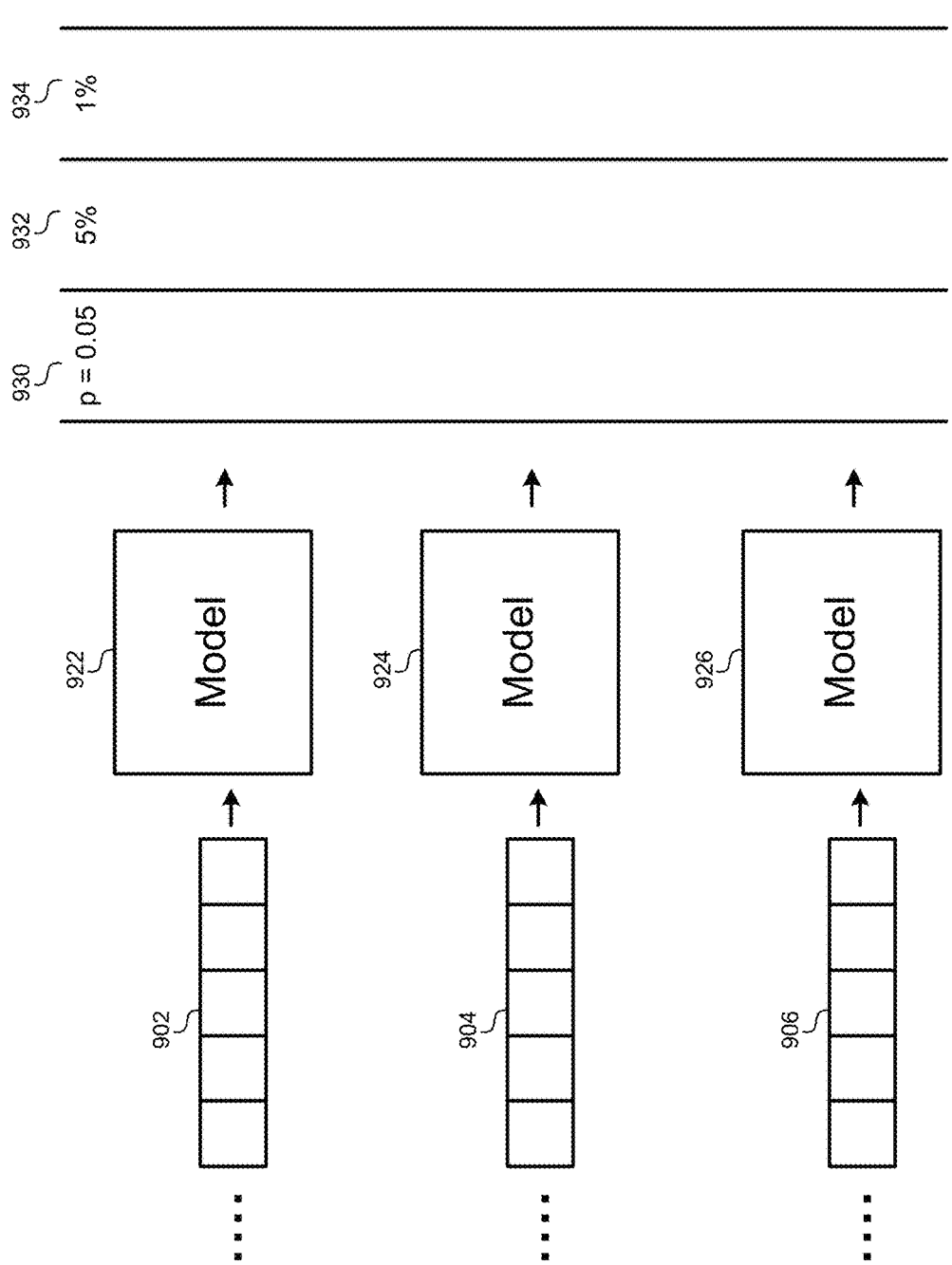
FIG. 9 illustrates how a model may be generated for each of the time series under consideration, according to some embodiments.

FIG. 9 illustrates how a model may be generated for each of the time series under consideration, according to some embodiments. Using the process described above in FIG. 8, a model may be generated for each individual time series. For example, time series 902 may be associated with a model 922, time series 904 may be associated with its own model 924, time series 906 may be associated with its own model 926, and so forth. Note that only three models 922, 924, 926 are illustrated in FIG. 9 as examples. It will be understood that at least as many additional time series and model pairs may be present as there are time series, and those are not expressly illustrated here.

Instead of generating a model for every time series, some embodiments may first eliminate any collinear time series from consideration. Collinear time series may follow very similar trajectories (i.e., may have a similar shape, movement, and distributional characteristics). If two time series are considered collinear within a threshold amount (e.g. greater than 95% the same with respect to specific statistical criteria such as correlation or Kullback-Leibler like divergence measures), then only one of these two time series needs to be considered as a dependent variable for its own model. These collinear time series may also be eliminated as independent variables for other time series models. One of the collinear time series may be maintained while the others are eliminated just for the purpose of modeling for a given dependent variable. The choice as to which time series may be maintained may be based on domain knowledge of the user. Certain variables in a collinear time series pair or group may be more fundamental to the process, and are thus retained, while the rest in the pair or group are considered derived.

As described above, one of the parameters that may be set for the models 922, 924, 926 is the number integrations to be performed for each of the independent time series inputs. Although any number of integrations may be used, it has been found in these embodiments that a maximum of three levels of integration may produce stable models. Above this, the causal relationships detections tend to become sensitive to deterministic chaotic behavior of the underlying equations, and less likely to indicate a real-world relationship. Therefore, some embodiments may limit the number of integrations performed to three or fewer.

At this stage, the models may indicate which of the independent inputs have causal relationships with the dependent input using the Granger causality test. For example, model 922 may indicate which of the other time series have causal relationships with time series 902. In practice many time series will have some relationship with other time series. Therefore, some embodiments may apply additional filters or adjust additional parameters in the models 922, 924, 926.

One filter 930 that may be applied to the outputs of the models may include a statistical significance of the causal relationship. This statistical significance may be represented by the p parameter of the model. In some embodiments, it has been discovered that an optimal cutoff point is approximately p=0.05 or lower. The p-value gives a measure of the likelihood that in a scenario where there is no relationship between the variables, how likely is it that observed data will show the relationship, or the likelihood that those correlations or statistical relationships or measures occur at the level that they do just by pure chance or random noise, and not due to some systematic real world connection. If the probability that the null hypothesis is true is less than 0.05, then in the scenario where the null hypothesis that the relationship does not exist is true, there is only a 5% chance of observing the observed data, and therefore, the null hypothesis should be rejected if we accept this 5% level of significance. The null hypothesis in this case is that there is no relationship found between variables. The lower the p-value, the more surprising the evidence is, the more ridiculous our null hypothesis becomes. Again, real-world examples may have hundreds of thousands of data points.

This filter allows the system to present the most important causal relationships to a user rather than all possible relationships that may be found by the models.

Additionally, as the number of data points in each time series grows smaller, the p value may be adjusted. The value for p may go one order of magnitude lower for each order of magnitude with which the number of data points is reduced. For example, if a time series has a few thousand data points, the system may instead use p=0.005. In contrast, if the system has only a few hundred data points, the system may instead use p=0.0005, and under 100 data points may use p=0.00005. If the system has fewer than 30 data points, then the system might use p=0.00001. The value for p used for significance threshold may also be adjustable by expert users depending on domain-specific knowledge, but in general, the number of data points may depend on the length of the time window that the user chooses, along with the amount of data accumulated over time in the data warehouse storing the time series.

The p value filter 930 may be used to indicate statistical significance. An additional filter 932 may be applied to also require a level of practical significance for each causal relationship identified by a model. For all independent variables that pass the statistical significance filter above, a practical significance filter 932 may be applied using the size of the contribution by the independent variable to affect a change in the dependent variable. Especially in very large data sets, even small changes may be found to be statistically significant. However, the embodiments described herein are mainly concerned with drivers of large changes in a time series. Therefore, some embodiments may use one or more threshold levels as a cutoff for practical significance.

For example, the filter 932 may be tailored for presentation to the user. This may serve to eliminate data from specific variables from presentation to the user. In some embodiments, each of the independent variables represented by other time series may require a minimum size of contribution by that specific independent variable to a change in the dependent variable, for meriting presentation to the end user. Although any value may be used as a threshold, a value of 5% or more of a contribution to changes in the dependent variable based on the coefficient of the independent variable has been used to determine if that particular independent variable will be shown in a visualization displayed to the user. While this filter 932 may affect the presentation of the user, eliminated independent variables in this step are not necessarily eliminated from the model. Instead, these variables are only excluded from the display of a result set to the user, while they are able to still continue affecting the model.

In contrast, another filter 934 may use a much lower or stricter threshold to remove independent variables from the model altogether. For all independent variables that passed the statistical significance filter 930 but failed the practical significance filter 932, the system may perform an additional filter 934 at a smaller level of contribution to determine whether the variable should be kept in the model at all. For example, a minimum of 1% contribution to changes in the dependent variable may be required in order to keep the independent variable in the model. This filter may be important for further optimizing the performance of the algorithm, and implementing the scientific principle of Occam's razor. Eliminating independent variables allows these variables to be removed from the in-memory storage, which reduces memory requirements and increases the speed with which the collective set of time series may be processed. The filter 934 also has the effect of removing unnecessary noise from the model to improve performance with respect to memory and CPU usage. Note that some embodiments may allow these thresholds for filter 932 and filter 934 to be adjusted by administrative users for different implementations.

Figure 10:
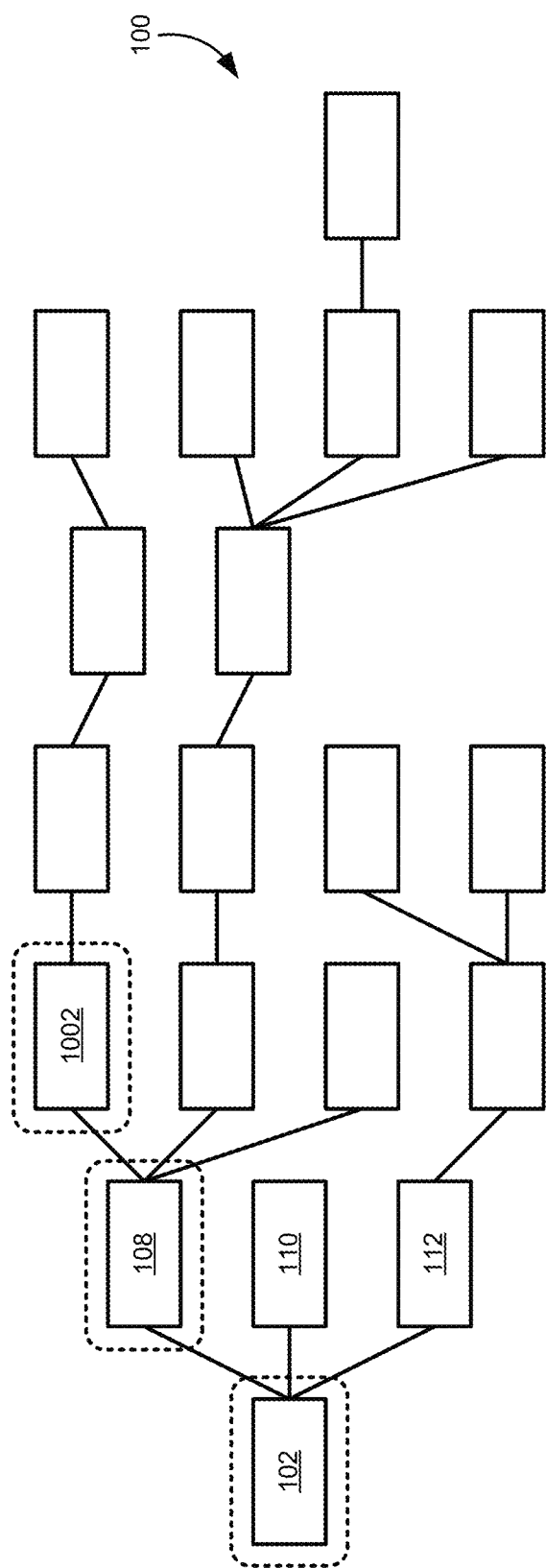
FIG. 10 illustrates how this algorithm may be executed recursively for each node in the hierarchy to generate a model and identify a final set of causal relationships for each node, according to some embodiments.

FIG. 10 illustrates how this algorithm may be executed recursively for each node in the hierarchy to generate a model and identify a final set of causal relationships for each node, according to some embodiments. FIG. 10 illustrates a subset of the data structure 100 from FIG. 1. Recall that not all of the nodes that are part of the data structure 100 have been included in this analysis. For each node included in the analysis, the process described above in FIGS. 8-9 may be executed recursively in a manner that is ordered by the hierarchy of the data structure 100. This recursive execution may be performed in a breadth-first manner rather than a depth-first manner.

In this example, the algorithm may begin with the time series of node 102. This time series may be provided to a model along with the time series from each of the other nodes under consideration. The model may be fit to identify which of those nodes has a causal relationship with node 102 that is of both practical and statistical significance as described above. The inputs may be funneled such that some time series may be removed from the model as described above.

After the causal relationships are identified for node 102, each of the nodes in the second level (e.g. node 108, node 110, node 112) that are part of the analysis group of nodes may be processed. This algorithm may traverse recursively through each of the different levels. In order to avoid cyclical recursion, the algorithm may stop this recursion at each node whenever a significant causal relationship is discovered that already exists in the set of relationships. The algorithm may then carry on to the next node in the breadth-first search.

Performing a breadth-first search as opposed to a depth-first search may be important for a number of reasons. First, traversing the data structure 100 from top to bottom allows circular dependencies to be detected and stop the recursion. Second, performing a depth-first search is computationally riskier compared to a breadth-first search, as it can lead to a traversal of unlikely tree branches, without first finding the most important relationships that affect the top level variables. Finally, it has been discovered that a depth-first search can often times identify long distance anecdotal relationships in the graph. Therefore, the breadth-first search is more efficient for this problem.

Figure 11:
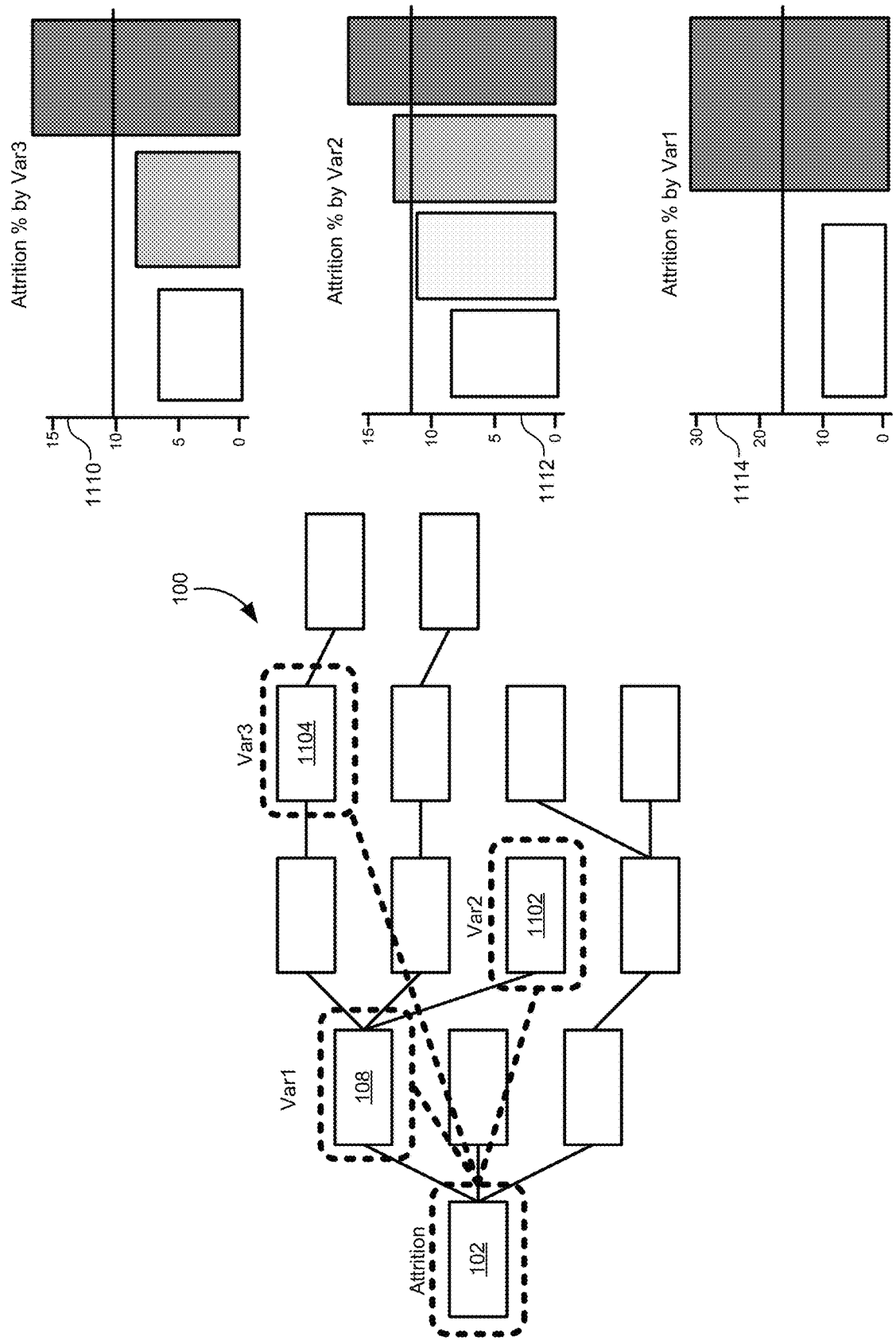
FIG. 11 illustrates how results of the algorithm described above can be displayed in a usable fashion for a user, according to some embodiments.

FIG. 11 illustrates how results of the algorithm described above can be displayed in a usable fashion for a user, according to some embodiments. After having identified the most relevant causal relationships for a node 102, all of these causal relationships may be compiled together into a list of other nodes in the data structure 100 that drive the node 102. In the simplified example of FIG. 11, the three other nodes may be identified as driver nodes that have a causal relationship with node 102. These driver nodes may include node 108, node 1102, and node 1104.

After identifying the list of driver nodes, the driver nodes may be ranked according to their statistical contribution to the node 102. In some embodiments, the model may generate a weighted combination of independent variable inputs. Each of those variable inputs may have a coefficient assigned that is fitted by the modeling process. The magnitude of the coefficient may directly indicate a contribution to a variation in the node 102 as all the variables are self-normalized. Each of the driver nodes may be ordered based on the relative size or magnitude of their coefficient in the model for node 102.

Various methods may be used to display this information to the user in a usable fashion. In the example of FIG. 11, a bar graph for each node is displayed in the order determined above through the magnitude of the coefficients. For example, node 1104 (e.g. Var3) may have the largest coefficient and may therefore contribute the most to changes in the node 102. Bar graph 1110 may be displayed at the top of a result list. Each of the bars in the bar graph 1110 illustrate a value assigned to node 1104 in the time series. This allows the user to see which values in the time series of node 1104 have the most effect on the time series in node 102. Similarly, bar graph 1112 may be associated with node 1102, and bar graph 1114 may be associated with node 108 in that order.

The result of the process above is a determination as to which time series in the data structure 100 are the drivers of change in a particular node. This process automatically identifies those time series and ranks them in order of importance. This ranking may be used to display the results in order of importance to the user. This represents a technical improvement in the way that data is generated and displayed. This type of meaningful ordering of the data by strength of relationships was not previously available, and could not be automatically isolated by users from the overwhelming amount of data that may be present in the data structure 100. As stated above, the data structure 100 may include hundreds of thousands of time series, and the sheer number of weak correlative relationships would be so overwhelming as to be useless to a user looking to make decisions based on insights from the data. The embodiments described above not only efficiently process all of these time series, but they also generate a display of information that is much more useful and that was not previously available.

Figure 12:
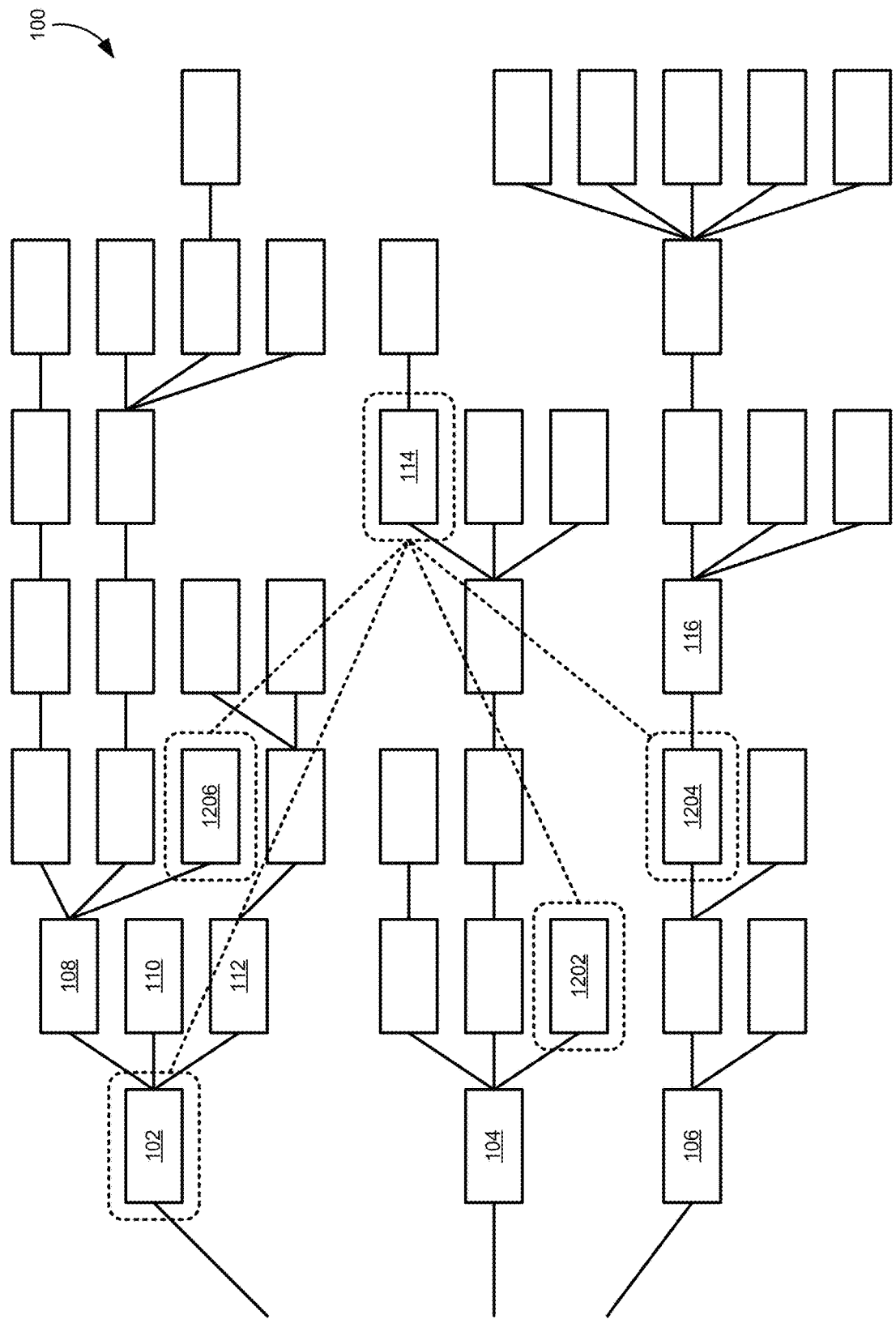
FIG. 12 illustrates how identifying driver nodes in the data structure may be used to identify master regulator nodes, according to some embodiments.

FIG. 12 illustrates how identifying driver nodes in the data structure 100 may be used to identify master regulator nodes, according to some embodiments. After a list of drivers have been identified for each of the nodes in the analysis above, a second search may be performed among these nodes to identify nodes that are drivers for multiple higher level nodes. These reverse connections may be aggregated for each node, and nodes that have the most influence within the data structure 100 may be identified. These influential nodes may be referred to as master regulator nodes, as they serve to regulate many different time series within the data structure 100.

In some embodiments, the algorithm may search for single nodes which are second, third, fourth, etc. level nodes in the data structure 100 which are also drivers of multiple other nodes. The algorithm may begin by identifying nodes that are drivers for two or more nodes and use tighter bounds for statistical and practical significance as more are found. These master regulators may then be identified. In a path prescription model, these master regulators may serve as both enablers of making large-scale changes within various time series in the data structure 100, as well as potential roadblocks for otherwise making well-directed change in these time series.

After creating an acyclic graph of relationships between nodes, the algorithm may begin by identifying lower-level nodes that directly explain more than a 5% variability in at least two higher level nodes. Similar to how filters for practical significance and statistical significance were used above, a threshold may be applied to identify nodes that have both a practically and statistically significant influence on multiple nodes. To classify these nodes as master regulator nodes, the influence on practical changes in higher-level nodes may be raised to a higher threshold, such as 10%.

In the example of FIG. 12, node 114 may be identified as producing at least a 5% effect on changes found in node 102, node 1202, node 1204, and node 1206. Because more than two of these significant relationships exist for node 114, node 114 may be labeled as a master regulator node in the data structure 100. Also note that exogenous variables may be identified as master regulator nodes outside of the data structure 100, although they are not shown explicitly in FIG. 12. These exogenous variables would be identified by the models described above in the same manner as the time series nodes have been identified.

Figure 13:
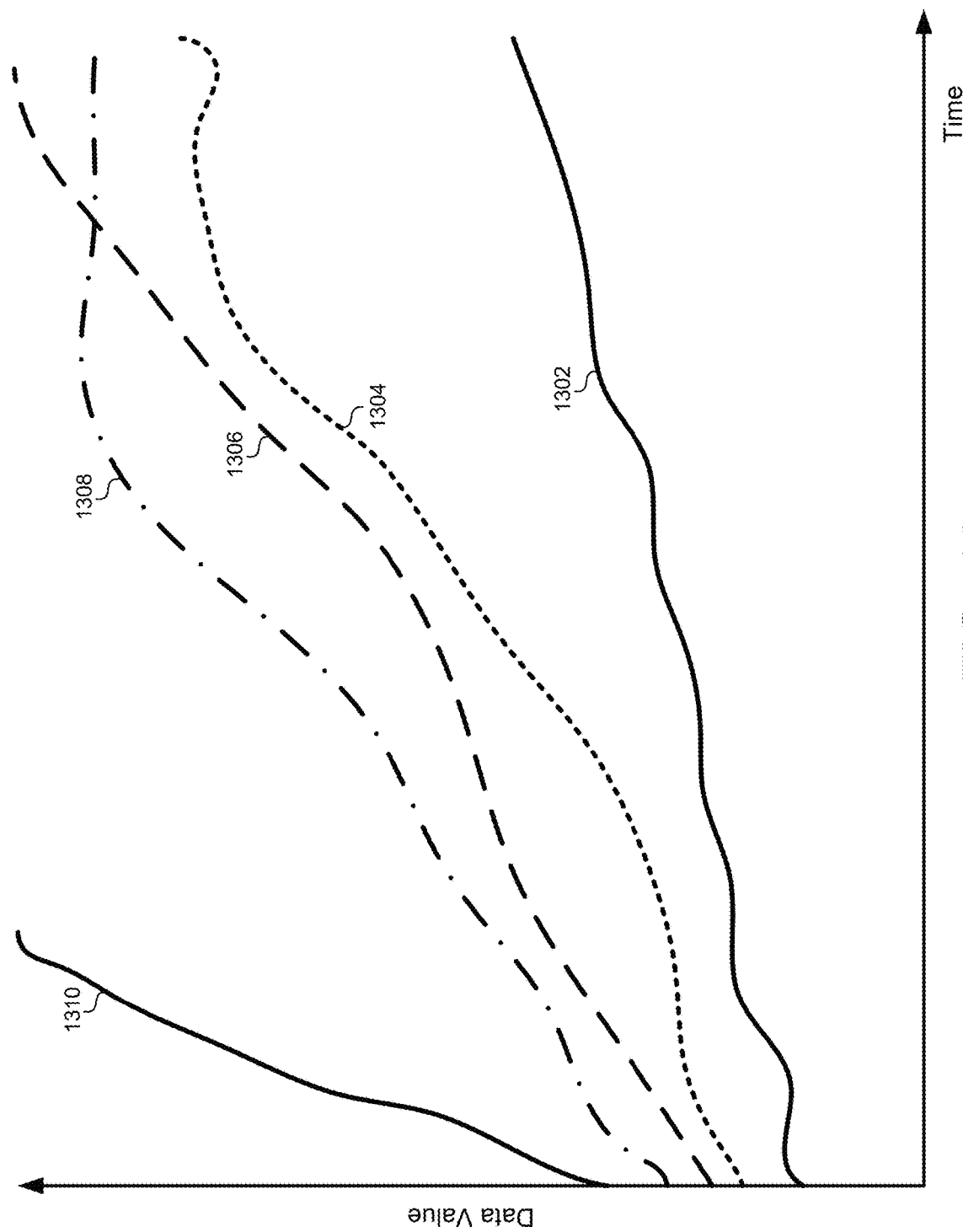
FIG. 13 illustrates how a simulation of using the models for each time series may be used to illustrate the effects of a master regulator node, according to some embodiments.

FIG. 13 illustrates how a simulation of using the models for each time series may be used to illustrate the effects of a master regulator node, according to some embodiments. Once the master regulator nodes are identified, simulations may be used to visualize the effect that those nodes may have on other nodes in the data structure 100. Specifically, new future predictions in the time series may be generated for a master regulator node and added to the time series. These new predictions in the time series for the master regulator nodes can then be input to models created above to generate output predictions for each of the higher-level nodes influenced by the master regulator node.

In some cases, a different model may be generated and used once the master regulator nodes are identified. Since there will be relatively few of these in the data structure 100, these master regulator nodes may have new models generated for them that may generate more precise results. For example, a new model may be generated using VARFIMA or LSTM models that are more computationally expensive, yet which are more computationally feasible at this stage.

The new data input provided to the model for the master regulator node may represent proposed changes to calculate what might happen in what-if scenarios in a real-world system or structure that is represented by the time series. For example, the time series may represent a real-world type of working condition for employer. This working condition may strongly influence a plurality of higher-level time series metrics, representing metrics such as retention, productivity, satisfaction, and so forth. Test data may be generated that changes this working condition as represented by the time series. This time series may be provided as an input to the models for each of the higher-level nodes that are affected by this master regulator node. These models may then generate predicted outputs based on the new inputs for the master regulator node.

In FIG. 13, new input data may be provided for the master regulator node as illustrated by curve 1302. For example, this data may represent an increase or improvement in a particular working condition. Each of the nodes that depend on the master regulator node (e.g., node 102, node 1202, node 1204, node 1206) may have their outputs predicted by their respective models, and the data may be presented next to the data for the master regulator node. For example, the simulated results of node 102, node 1202, node 1204, node 1206 may be displayed as curves 1304, 1306, 1308, 1310, respectively, alongside curve 1302 for node 114.

The simulations may also be governed using real-world constraints as boundary conditions imposed on the values that may be provided in the different scenarios being simulated. For example, simulations may generate an optimal value for the master regulator node that would not be feasible in real-world scenarios. Although mathematically correct, the real-world implementation of the resulting time series may not work. Therefore, some boundaries on the simulated values for the master regulator node may be imposed to maintain real-world results that are feasible. Providing such boundaries also reduces the search space for the optimization.

These lower-level master regulator nodes may be displayed with the data for the higher-level nodes that they strongly influence. This may demonstrate the systemic impact of changes in these lower-level nodes. These may be used to generate multiple "what if" predictions by simulating each model out a few points at a time to show an upward cascade of effects driven by these master regulator nodes. In some embodiments, a path predictor algorithm may be used to identify a shortest path to a desired outcome in one of the nodes that is influenced by the master regulator node. An optimal value may be identified for the master regulator node using the simulations described above. This optimal value may then be used as a starting point in a path predictor algorithm to find the shortest path to recovery. This represents a technical improvement, as previous attempts to use such path predictor algorithms did not have an optimal starting point for their algorithm. This allows the range of values for the master regulators in the path predictor algorithm to remain stable while varying other values to find an optimal path, rather than trying to change all variables at once which is not realistic for a real world scenario of trying to control an enterprise system.

Figure 14:
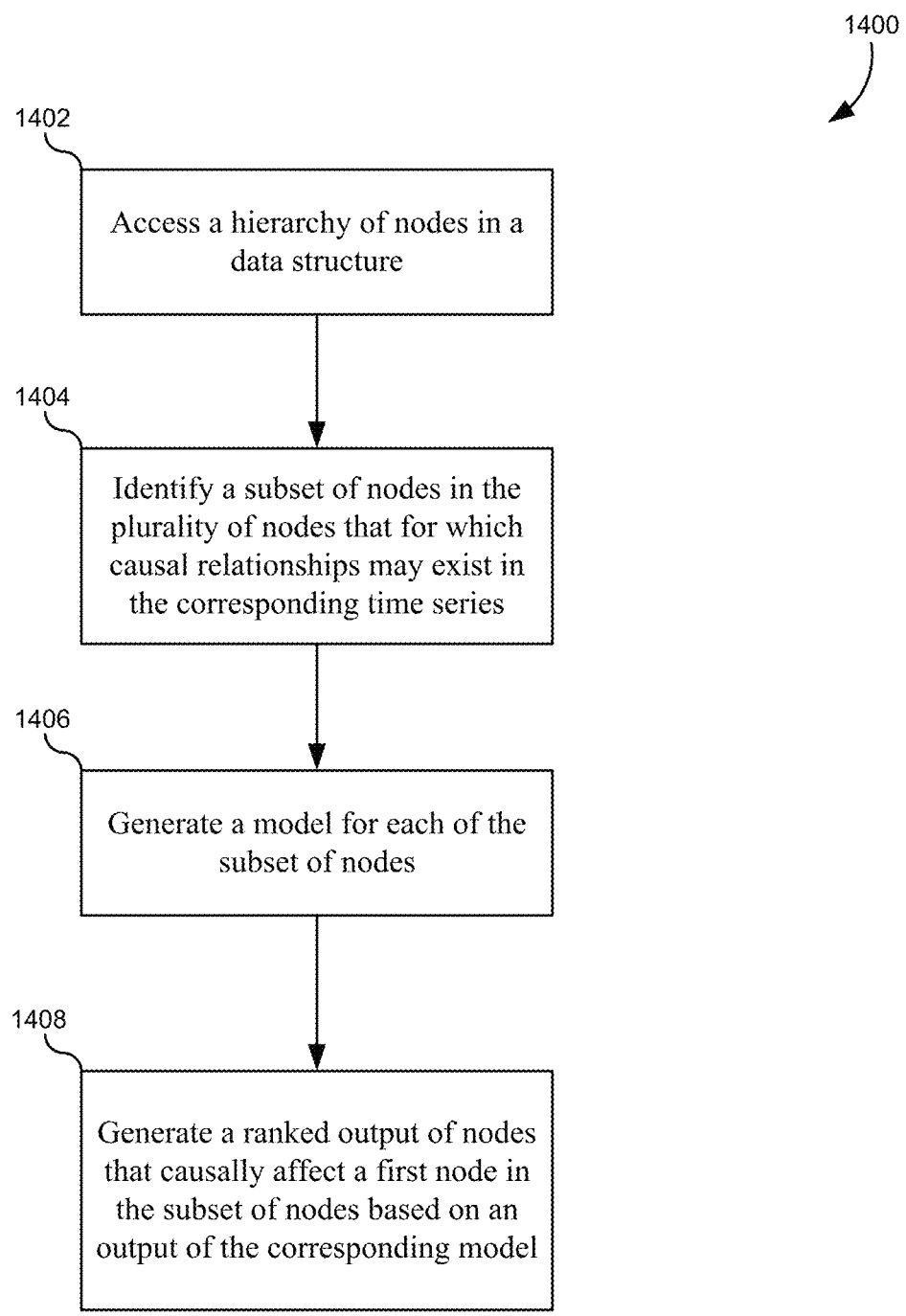
FIG. 14 illustrates a flowchart of a method for identifying causal relationships in a plurality of nodes, according to some embodiments.

FIG. 14 illustrates a flowchart of a method for identifying causal relationships in a plurality of nodes, according to some embodiments. The method may include accessing a hierarchy of nodes in a data structure (1402). Each node in the plurality of nodes may include a time series of data as described above in FIG. 1.

The method may also include identifying a subset of nodes in the plurality of nodes for which causal relationships may exist in the corresponding time series (1404). This subset may be identified as described above in FIGS. 2-7. Each of the steps in relation to these figures may be performed to identify a subset of nodes and otherwise process those nodes to be ready for subsequent steps in this method. This may include normalization, filtering, using user roles or machine learning to identify patterns of nodes, and so forth.

The method may additionally include generating a model for each of the subset of nodes (1406). The model may receive the subset of nodes and may generate coefficients for each of the subset of nodes indicating how strongly each of the subset of nodes causally affects a first node in the subset of nodes. This step may be carried out as described above in relation to FIGS. 8-11.

The method may further include generating a ranked output of nodes that causally affect a first node in the subset of nodes based on an output of the corresponding model (1408). This step may be carried out as described above and elation to FIGS. 10-13.

It should be appreciated that the specific steps illustrated in FIG. 14 provide particular methods of identifying causal relationships in a plurality of nodes according to various embodiments. Other sequences of steps may also be performed according to alternative embodiments. For example, alternative embodiments may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 15:
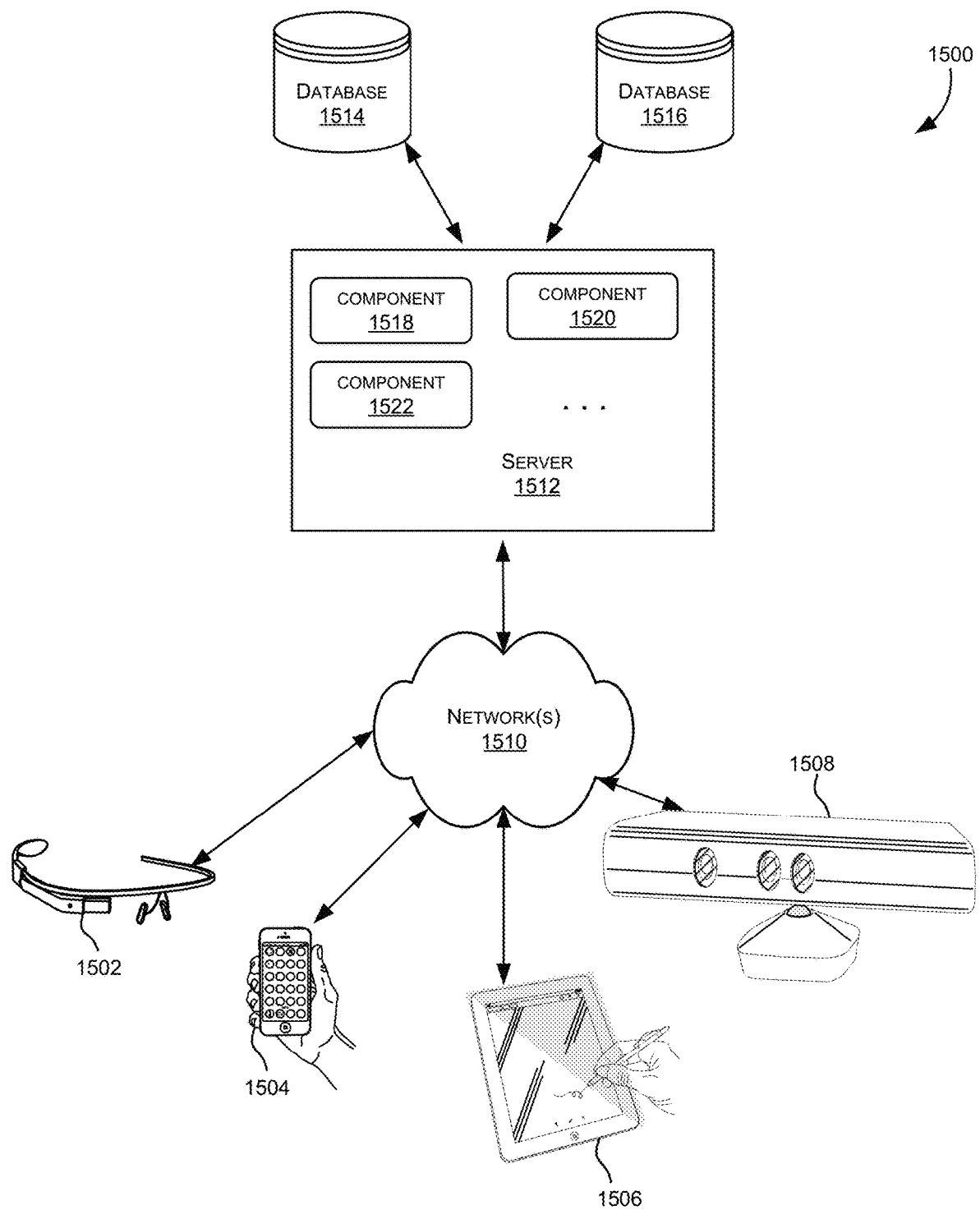
FIG. 15 illustrates a simplified block diagram of a distributed system for implementing some of the embodiments.

FIG. 15 depicts a simplified diagram of a distributed system 1500 for implementing one of the embodiments. In the illustrated embodiment, distributed system 1500 includes one or more client computing devices 1502, 1504, 1506, and 1508, which are configured to execute and operate a client application such as a web browser, proprietary client (e.g., Oracle Forms), or the like over one or more network(s) 1510. Server 1512 may be communicatively coupled with remote client computing devices 1502, 1504, 1506, and 1508 via network 1510.

In various embodiments, server 1512 may be adapted to run one or more services or software applications provided by one or more of the components of the system. In some embodiments, these services may be offered as web-based or cloud services or under a Software as a Service (SaaS) model to the users of client computing devices 1502, 1504, 1506, and/or 1508. Users operating client computing devices 1502, 1504, 1506, and/or 1508 may in turn utilize one or more client applications to interact with server 1512 to utilize the services provided by these components.

In the configuration depicted in the figure, the software components 1518, 1520 and 1522 of system 1500 are shown as being implemented on server 1512. In other embodiments, one or more of the components of system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system

1500. The embodiment shown in the figure is thus one example of a distributed system for implementing an embodiment system and is not intended to be limiting.

Client computing devices 1502, 1504, 1506, and/or 1508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1502, 1504, 1506, and 1508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1510.

Although exemplary distributed system 1500 is shown with four client computing devices, any number of client computing devices may be supported. Other devices, such as devices with sensors, etc., may interact with server 1512.

Network(s) 1510 in distributed system 1500 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1510 can be a local area network (LAN), such as one based on Ethernet, Token-Ring and/or the like. Network(s) 1510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1512 may be adapted to run one or more services or software applications described in the foregoing disclosure. For example, server 1512 may correspond to a server for performing processing described above according to an embodiment of the present disclosure.

Server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1512 may include one or more applications to analyze and consolidate data feeds and/or event updates received from users of client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1512 may also include one or more applications to display the data feeds and/or real-time events via one or more display devices of client computing devices 1502, 1504, 1506, and 1508.

Distributed system 1500 may also include one or more databases 1514 and 1516. Databases 1514 and 1516 may reside in a variety of locations. By way of example, one or more of databases 1514 and 1516 may reside on a non-transitory storage medium local to (and/or resident in) server 1512. Alternatively, databases 1514 and 1516 may be remote from server 1512 and in communication with server 1512 via a network-based or dedicated connection. In one set of embodiments, databases 1514 and 1516 may reside in a storage-area network (SAN). Similarly, any necessary files for performing the functions attributed to server 1512 may be stored locally on server 1512 and/or remotely, as appropriate. In one set of embodiments, databases 1514 and 1516 may include relational databases, such as databases provided by Oracle, that are adapted to store, update, and retrieve data in response to SQL-formatted commands.

Figure 16:
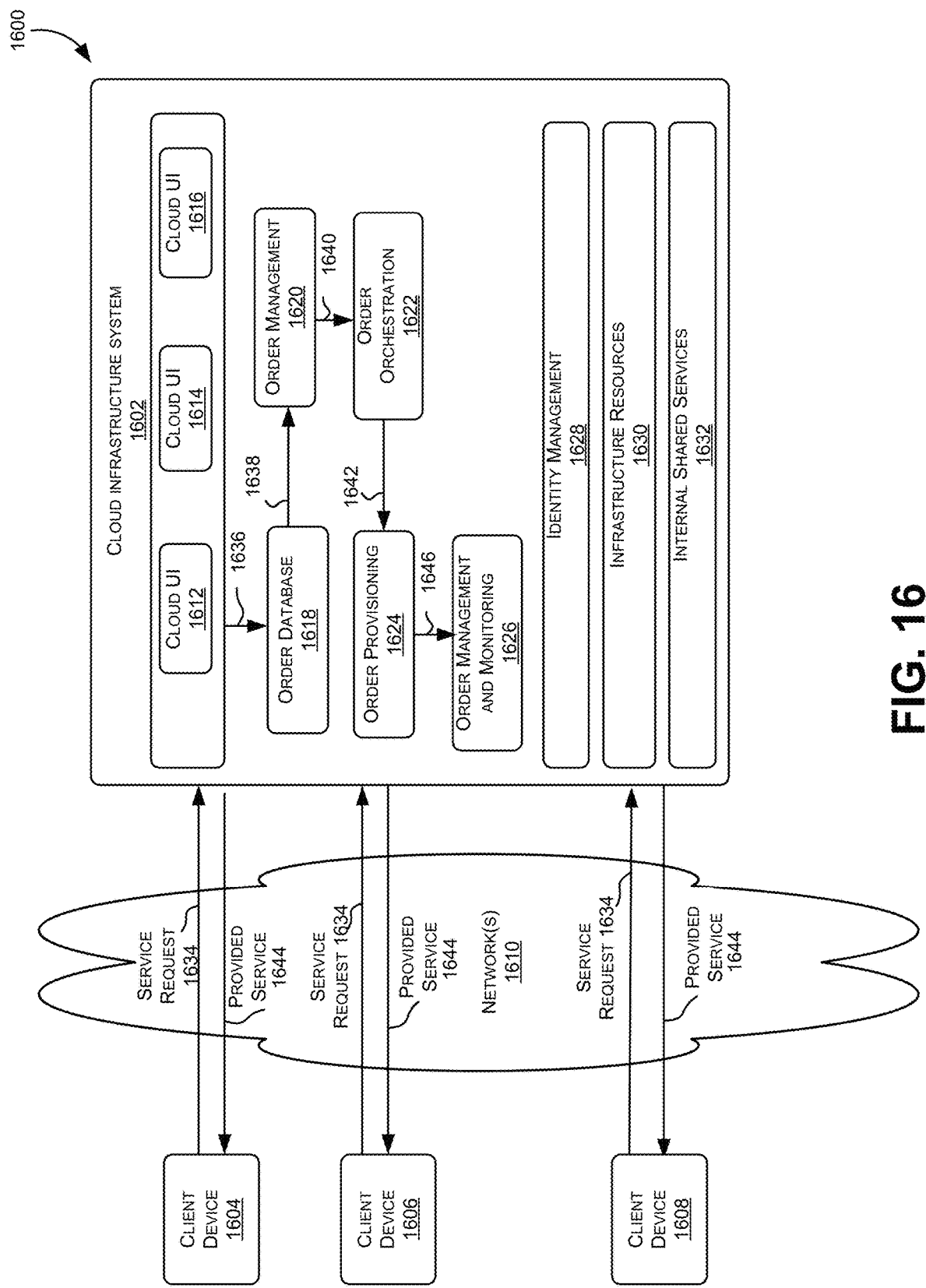
FIG. 16 illustrates a simplified block diagram of components of a system environment by which services provided by the components of an embodiment system may be offered as cloud services.

FIG. 16 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application (e.g., Oracle Forms), or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the system shown in the figure is only one example of a cloud infrastructure system that may incorporate some embodiments. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for 1502, 1504, 1506, and 1508.

Although exemplary system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network that can support data communications using any of a variety of commercially-available protocols, including those described above for network(s) 1510.

Cloud infrastructure system 1602 may comprise one or more computers and/or servers that may include those described above for server 1512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services (e.g., owned by Oracle) and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In exemplary operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616.

At operation 1636, the order is stored in order database 1618. Order database 1618 can be one of several databases operated by cloud infrastructure system 1618 and operated in conjunction with other system elements.

At operation 1638, the order information is forwarded to an order management module 1620. In some instances, order management module 1620 may be configured to perform billing and accounting functions related to the order, such as verifying the order, and upon verification, booking the order.

At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1600 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1600 may include an identity management module 1628. Identity management module 1628 may be configured to provide identity services, such as access management and authorization services in cloud infrastructure system 1600. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

Figure 17:
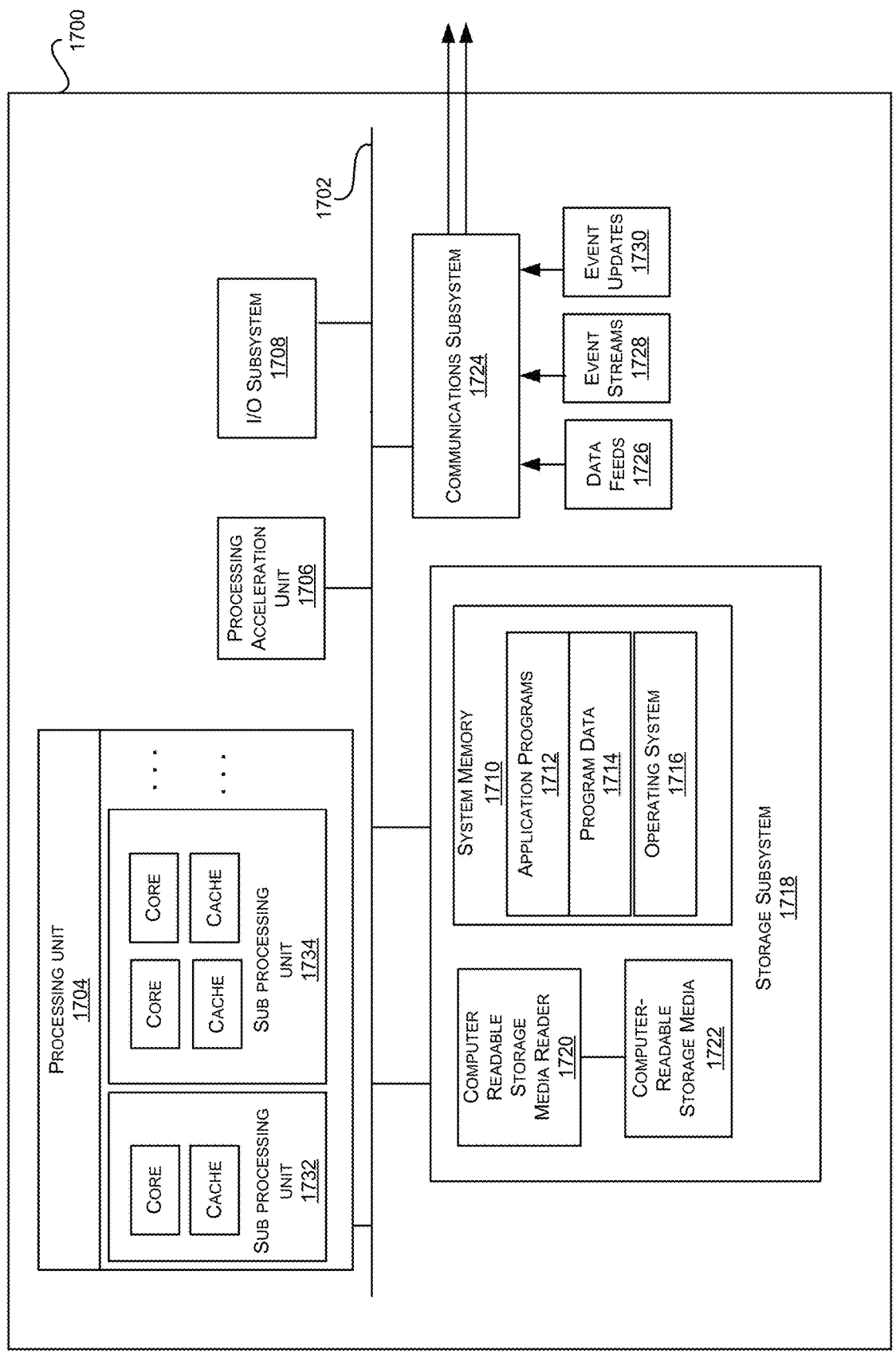
FIG. 17 illustrates an exemplary computer system, in which various embodiments may be implemented.

FIG. 17 illustrates an exemplary computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with some embodiments.

Storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

In the foregoing description, time series representing metrics each of the nodes have been described generically. In one particular embodiment, these metrics may specifically refer to Key Performance Indicators (KPIs) that are tracked by an organization. The methods and systems described above may be used to identify KPIs that causally influence other KPIs. KPIs may include revenue, attrition, sales, profit, and/or other metrics that are tracked by business.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of identifying causal relationships between time series, the method comprising:
    accessing a hierarchy of nodes in a data structure, wherein each node in the hierarchy of nodes comprises a time series of data;
    identifying a subset of nodes in the plurality of nodes for which causal relationships may exist in the corresponding time series;
    generating models for nodes in the subset of nodes, wherein each of the models is generated for a corresponding node, and each of the models receives the other nodes in the subset of nodes as inputs and generates coefficients for the other nodes in the subset of nodes indicating how strongly each of the other nodes in the subset of nodes causally affects the corresponding node;
    generating a ranked output of nodes that causally affect the corresponding node of each of the models.

2. The method of claim 1, further comprising:
    identifying master regulator nodes in the subset of nodes that causally affect a plurality of other nodes in the subset of nodes by greater than a threshold amount.

3. The method of claim 2, further comprising:
    receiving hypothetical time series data for a master regulator node;
    providing the hypothetical time series data as an input to the models corresponding to nodes that are causally affected by the master regulator node;
    generating graphical outputs of each of the models corresponding to the nodes that are causally affected by the master regulator node to show the effect of the hypothetical time series data from the master regulator node.

4. The method of claim 3, further comprising:
    determining an optimal hypothetical time series for the master regulator node; and
    providing the optimal hypothetical time series as a fixed input value to a path predictor algorithm to solve for an optimal solution relative to the nodes that are causally affected by the master regulator node.

5. The method of claim 1, wherein the hierarchy of nodes in the data structure comprises a plurality of non-cyclical, linear parent-child relationships.

6. The method of claim 1, wherein identifying the subset of nodes in the plurality of nodes for which causal relationships may exist comprises:
identifying a user;
accessing a pattern of previous node selections by the user; and
identifying the subset of nodes based on the pattern of previous node selections by the user.

7. The method of claim 1, wherein identifying the subset of nodes in the plurality of nodes for which causal relationships may exist comprises:
identifying a user or user group;
providing an identification of the user or user group to a trained model; and
receiving a selection of the subset of notes from the trained model.

8. A non-transitory computer-readable medium comprising instructions that, when executed by one or more processors, cause the one or more processors to perform operations comprising:
accessing a hierarchy of nodes in a data structure, wherein each node in the plurality of nodes comprises a time series of data;
identifying a subset of nodes in the plurality of nodes for which causal relationships may exist in the corresponding time series;
generating models for nodes in the subset of nodes, wherein each of the models is generated for a corresponding node, and each of the models receives the other nodes in the subset of nodes as inputs and generates coefficients for the other nodes in the subset of nodes indicating how strongly each of the other nodes in the subset of nodes causally affects the corresponding node;
generating a ranked output of nodes that causally affect the corresponding node of each of the models.

9. The non-transitory computer-readable medium of claim 8, wherein the operations further comprise:
identifying a plurality of data tables in a data warehouse associated with a node in the subset of nodes; and
denormalizing the plurality of data tables into a single data table for the node before generating the corresponding model for the node.

10. The non-transitory computer-readable medium of claim 8, wherein identifying the subset of nodes in the plurality of nodes for which causal relationships may exist comprises:
identifying a predicted CPU and memory usage;
comparing the current CPU and memory usage to a threshold; and
adding additional nodes from the hierarchy of nodes to the subset of nodes until the predicted CPU and memory usage reaches the threshold.

11. The non-transitory computer-readable medium of claim 10, wherein the additional nodes are identified as having overlapping time periods in data with at least one of the subset of nodes.

12. The non-transitory computer-readable medium of claim 8, wherein the operations further comprise:
eliminating nodes from the subset of nodes that do not show a statistically significant change of more than a threshold number of standard deviations in a corresponding time series of data.

13. The non-transitory computer-readable medium of claim 8, wherein the operations further comprise:
eliminating nodes from the subset of nodes for which at least a threshold number of incremental changes between entries in a corresponding time series of data are not in a same direction indicating a trend.

14. The non-transitory computer-readable medium of claim 8, wherein at least one of the models receives an exogenous variable from an external data source.

15. A system comprising:
one or more processors; and
one or more memory devices comprising instructions that, when executed by the one or more processors, cause the one or more processors to perform operations comprising:
accessing a hierarchy of nodes in a data structure, wherein each node in the hierarchy of nodes comprises a time series of data;
identifying a subset of nodes in the plurality of nodes for which causal relationships may exist in the corresponding time series;
generating models for nodes in the subset of nodes, wherein each of the models is generated for a corresponding node, and each of the models receives the other nodes in the subset of nodes as inputs and generates coefficients for the other nodes in the subset of nodes indicating how strongly each of the other nodes in the subset of nodes causally affects the corresponding node;
generating a ranked output of nodes that causally affect the corresponding node of each of the models.

16. The system of claim 15, wherein the models are configured to integrate to a maximum of three levels for each input node.

17. The system of claim 15, wherein a p-value for one of the models is adjusted based on a number of data points in a time series of the corresponding node such that the p-value decreases an order of magnitude for each order of magnitude decrease in the length of the time series.

18. The system of claim 15, wherein the operations further comprise:
eliminating nodes from the ranked output of nodes that have less than a threshold level of contribution to the corresponding node of a model.

19. The system of claim 15, wherein the operations further comprise:
eliminating nodes as inputs to a model that have less than a threshold level of contribution to the corresponding node of the model.

20. The system of claim 15, wherein the operations further comprise:
traversing the hierarchy of nodes in a breadth-first search to identify nodes that causally affect a plurality of other nodes.

* * * * *

UNITED STATES PATENT AND TRADEMARK OFFICE
CERTIFICATE OF CORRECTION

PATENT NO. : 11,467,803 B2
APPLICATION NO. : 17/018794
DATED : October 11, 2022
INVENTOR(S) : Agrawal et al.

It is certified that error appears in the above-identified patent and that said Letters Patent is hereby corrected as shown below:

On the Title Page

On page 2, Column 2, under Other Publications, Line 20, delete "16/145,963Final" and insert -- 16/145,963 Final --, therefor.

On page 2, Column 2, under Other Publications, Line 40, after "2017" insert -- IEEE --, therefor.

In the Specification

In Column 7, Line 65, delete "that that" and insert -- that --, therefor.

In Column 9, Line 58, delete "or" and insert -- of --, therefor.

In Column 10, Line 21, delete "May" and insert -- may --, therefor.

In Column 10, Line 29, delete "May" and insert -- may --, therefor.

Signed and Sealed this
Twenty-first Day of March, 2023

Katherine Kelly Vidal
*Director of the United States Patent and Trademark Office*